US011877314B2

United States Patent
Parron et al.

(10) Patent No.: US 11,877,314 B2
(45) Date of Patent: *Jan. 16, 2024

(54) PRIORITIZED MESSAGING AND RESOURCE SELECTION IN VEHICLE-TO-VEHICLE (V2V) SIDELINK COMMUNICATION

(71) Applicant: Apple Inc., Cupertino, CA (US)

(72) Inventors: Jerome Parron, Fuerth (DE); Sergey Sosnin, Zavolzhie (RU); Kyeongin Jeong, Youngin-si (KR); Alexey Khoryaev, Nizhny Novgorod (RU); Mikhail Shilov, Nizhny Novgorod (RU); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/993,752

(22) Filed: Nov. 23, 2022

(65) Prior Publication Data

US 2023/0099813 A1 Mar. 30, 2023

Related U.S. Application Data

(63) Continuation of application No. 16/488,552, filed as application No. PCT/US2018/023525 on Mar. 21, 2018, now Pat. No. 11,553,503.

(Continued)

(51) Int. Cl.
*H04W 72/56* (2023.01)
*H04W 4/46* (2018.01)
(Continued)

(52) U.S. Cl.
CPC ............. *H04W 72/56* (2023.01); *H04W 4/46* (2018.02); *H04W 72/044* (2013.01);
(Continued)

(58) Field of Classification Search
CPC ..... H04W 4/46; H04W 72/044; H04W 72/23; H04W 72/56; H04W 88/08; H04W 92/18
See application file for complete search history.

(56) References Cited

U.S. PATENT DOCUMENTS

| | | | |
|---|---|---|---|
| 2013/0223398 A1* | 8/2013 | Li | H04W 72/542 370/329 |
| 2016/0112962 A1 | 4/2016 | Park | |

(Continued)

FOREIGN PATENT DOCUMENTS

| | | |
|---|---|---|
| CN | 1964544 | 5/2007 |
| CN | 101765117 | 6/2010 |

(Continued)

OTHER PUBLICATIONS

"3GPP; TSG RAN; Evolved Universal Terrestrial Radio Access (E-UTRA) and Evolved Universal Terrestrial Radio Access Network (E-UTRAN)'Overall description; Stage 2 (Release 14)", 3GPP TS 36.300 V14.1.0, (Dec. 30, 2016).

(Continued)

*Primary Examiner* — Saad A. Waqas
(74) *Attorney, Agent, or Firm* — Kowert, Hood, Munyon, Rankin & Goetzel, P.C.

(57) ABSTRACT

Embodiments of a Generation Node-B (gNB), User Equipment (UE) and methods for communication are generally described herein. The gNB may allocate a resource pool of physical resource blocks (PRBs) and sub-frames for vehicle-to-vehicle (V2V) sidelink transmissions. The gNB may receive, from a UE, an uplink control message that indicates that the UE requests a V2V sidelink transmission of a prioritized message. The gNB may select, for the V2V sidelink transmission of the prioritized message, one or more PRBs and one or more sub-frames. The gNB may transmit, to the UE and to other UEs, a downlink control message that indicates: the selected PRBs, the selected (Continued)

sub-frames, and that the other UEs are to mute sidelink transmissions in the selected PRBs in the selected sub-frames to enable the V2V sidelink transmission of the prioritized message.

20 Claims, 14 Drawing Sheets

Related U.S. Application Data

(60) Provisional application No. 62/587,382, filed on Nov. 16, 2017, provisional application No. 62/475,471, filed on Mar. 23, 2017.

(51) Int. Cl.
*H04W 72/044* (2023.01)
*H04W 72/23* (2023.01)
*H04W 88/08* (2009.01)
*H04W 92/18* (2009.01)

(52) U.S. Cl.
CPC ............ *H04W 72/23* (2023.01); *H04W 88/08* (2013.01); *H04W 92/18* (2013.01)

(56) References Cited

U.S. PATENT DOCUMENTS

| | | | | |
|---|---|---|---|---|
| 2016/0205525 | A1* | 7/2016 | Baghel | H04W 52/281 370/329 |
| 2017/0181064 | A1* | 6/2017 | Lee | H04W 76/14 |
| 2017/0230939 | A1* | 8/2017 | Rudolf | H04W 72/04 |
| 2018/0139724 | A1* | 5/2018 | Loehr | H04W 72/02 |
| 2019/0053251 | A1* | 2/2019 | Loehr | H04W 72/1263 |
| 2019/0191461 | A1* | 6/2019 | Lee | H04L 1/1614 |
| 2020/0077434 | A1 | 3/2020 | Kim et al. | |
| 2020/0107181 | A1* | 4/2020 | Bagayoko | H04L 5/0053 |
| 2020/0296690 | A1* | 9/2020 | Lee | H04W 4/40 |
| 2021/0144665 | A1* | 5/2021 | Ryu | H04W 76/14 |

FOREIGN PATENT DOCUMENTS

| | | | |
|---|---|---|---|
| CN | 103098416 | 5/2013 | |
| CN | 104954976 | 9/2015 | |
| CN | 105681439 | 6/2016 | |
| CN | 105979527 | 9/2016 | |
| CN | 106060947 | 10/2016 | |
| KR | 20160003257 | 1/2016 | |
| KR | 20170001528 | 1/2017 | |
| WO | WO-2014178671 A1 * | 11/2014 | ........ H04W 56/0015 |
| WO | 2014198325 | 12/2014 | |
| WO | 2016119124 | 8/2016 | |
| WO | 2016120940 | 8/2016 | |
| WO | 2017034340 | 3/2017 | |

OTHER PUBLICATIONS

"3GPP; TSG RAN; Evolved Universal Terrestrial Radio Access (E-UTRA); Physical layer 1procedures (Release 14)", 3GPP TS 36.213 V14.1.0, (Jan. 2, 2017).
"Details of resource selection by pedestrian UE using partial sensing", NTT DOCOMO, Inc., R1-1702771, 3GPP TSG RAN WG1 Meeting #88, Athens, Greece, (Feb. 7, 2017), 5 pgs.
"International Application Serial No. PCT/US2018/023525, International Search Report dated Jul. 27, 2018", 3 pgs.
"International Application Serial No. PCT/US2018/023525, VVritten Opinion dated Jul. 27, 2018", 4 pgs.
"Remaining issues related to Tx resource selection and pool usage", R2-1701146, 3GPP TSG-RAN VVG2 Meetinq #97, Athens, Greece, (Feb. 4, 2017), 4 pgs.
Extended European Search Report for European Application No. 18771874.7; dated Oct. 26, 2020, 9 pgs.
NTT DOCOMO, Inc .; Details of resource selection by pedestrian UE using partial sensing; 3GPP TSG RAN WG1 Meeting #88; Feb. 13-17, 2017; Agenda Item 7.2.1.2; Athens, Greece; 5 pgs.
Chinese Office Action from Chinese Patent Application No. 201880020226.4 dated Sep. 26, 2022, 29 pgs.

* cited by examiner ation Ser. No. 16/488,552, filed Aug. 23, 2019, which is a

PRIORITIZED MESSAGING AND RESOURCE SELECTION IN VEHICLE-TO-VEHICLE (V2V) SIDELINK COMMUNICATION

PRIORITY CLAIM

This application is a continuation of U.S. patent application Ser. No. 16/488,552, filed Aug. 23, 2019, which is a United States National Stage Filing under U.S.C. 371 from International Application No. PCT/US2018/023525, filed Mar. 21, 2018, which claims priority to U.S. Provisional Patent Application Ser. No. 62/475,471, filed Mar. 23, 2017, and to U.S. Provisional Patent Application Ser. No. 62/587,382, filed Nov. 16, 2017, all of which are incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to sidelink communication. Some embodiments relate to vehicle-to-vehicle (V2V) communication. Some embodiments relate to transmission of prioritized signals, emergency signals and/or signals for which ultra high reliability of reception is targeted, including transmission of such signals in V2V sidelink arrangements.

BACKGROUND

Mobile devices may exchange data in accordance with sidelink radio-protocols for communication, which may be challenging in some aspects. For instance, high reliability of reception may be challenging, especially in systems with distributed access to resources. In some cases, such as when mobile devices are out of network coverage, the mobile devices may perform sidelink communication autonomously with limited or no assistance from a base station. In other cases, a base station may provide assistance to the mobile devices for various tasks, such as allocation of resources, signaling of control messages and/or others. Various use cases for sidelink communication are possible. In an example scenario, sidelink communication in accordance with a low latency and high reliability may be used. In another example scenario, high priority messages may be exchanged between mobile devices using sidelink communication. There is a general need for methods and systems to enable sidelink communication and to target high reliability of reception in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
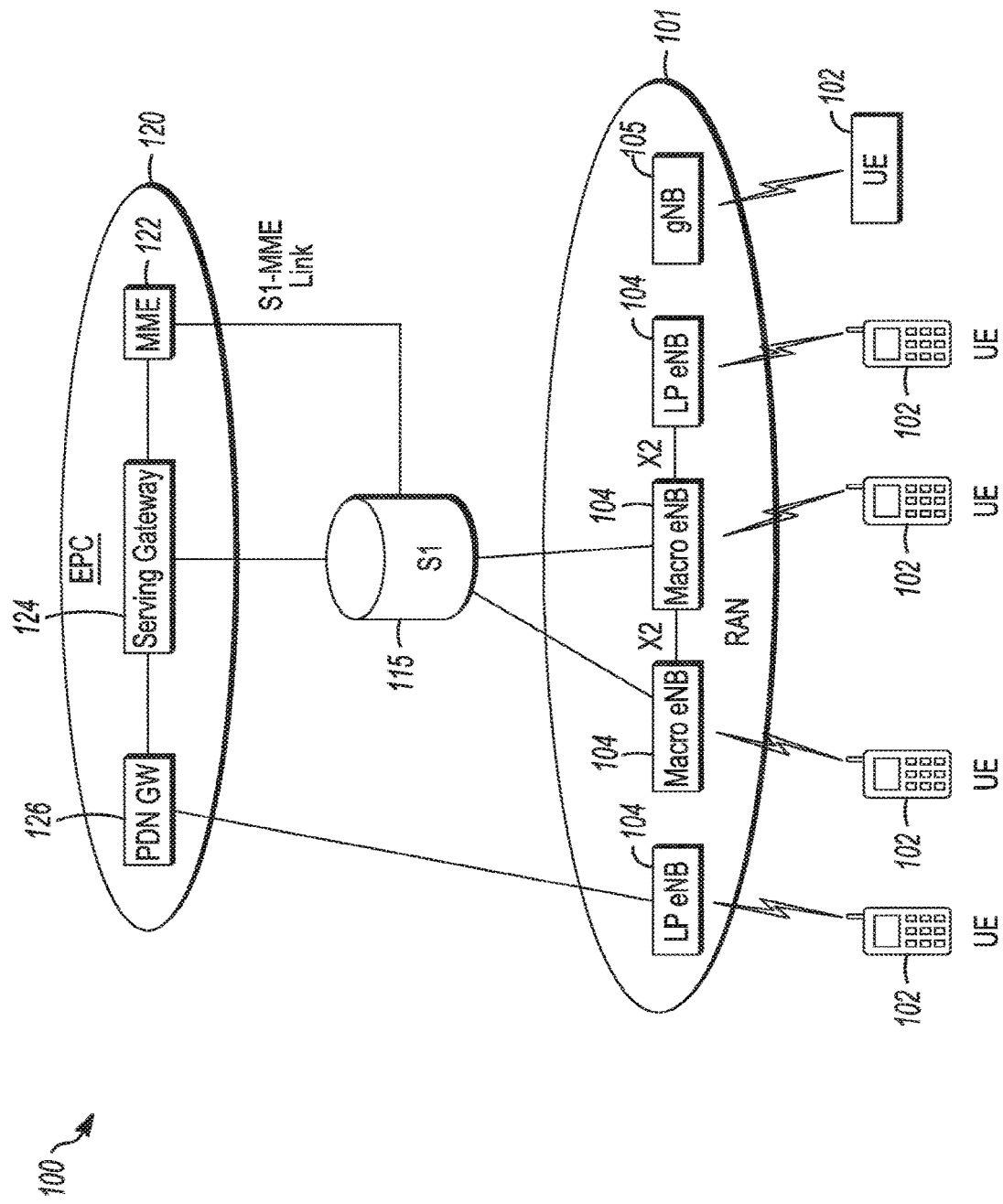
FIG. 1A is a functional diagram of an example network in accordance with some embodiments.
Figure 1B:
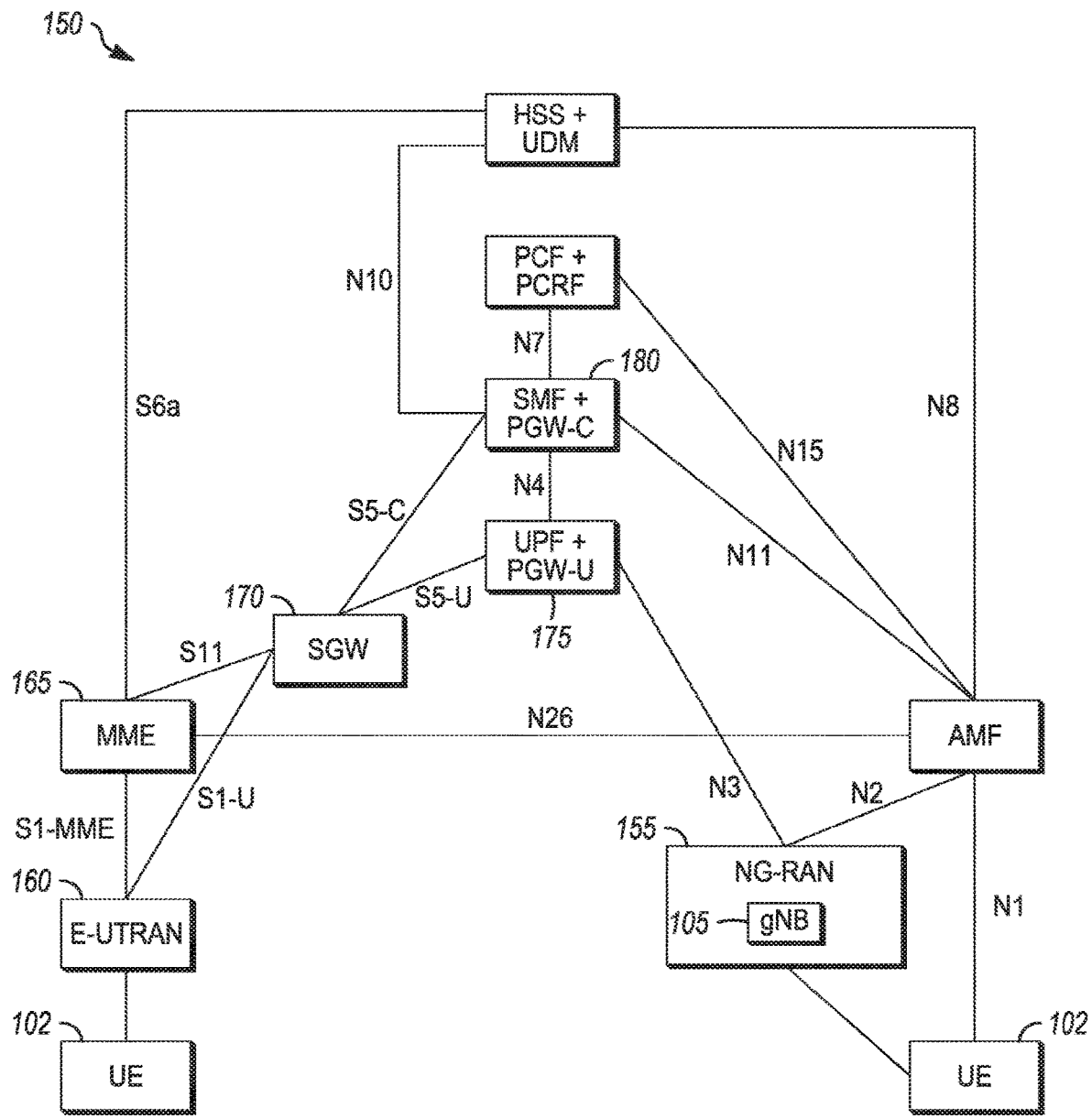
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, an LTE (E-UTRAN) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, eNBs 104 and/or gNBs 105 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-gNB handovers and/or inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 and/or gNBs 105 (macro and micro) terminate the air interface protocol and may be the first point of contact for a UE 102. In some embodiments, an eNB 104 and/or gNB 105 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U1 is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MMF, which is a signaling interface between the gNBs 105 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175, some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
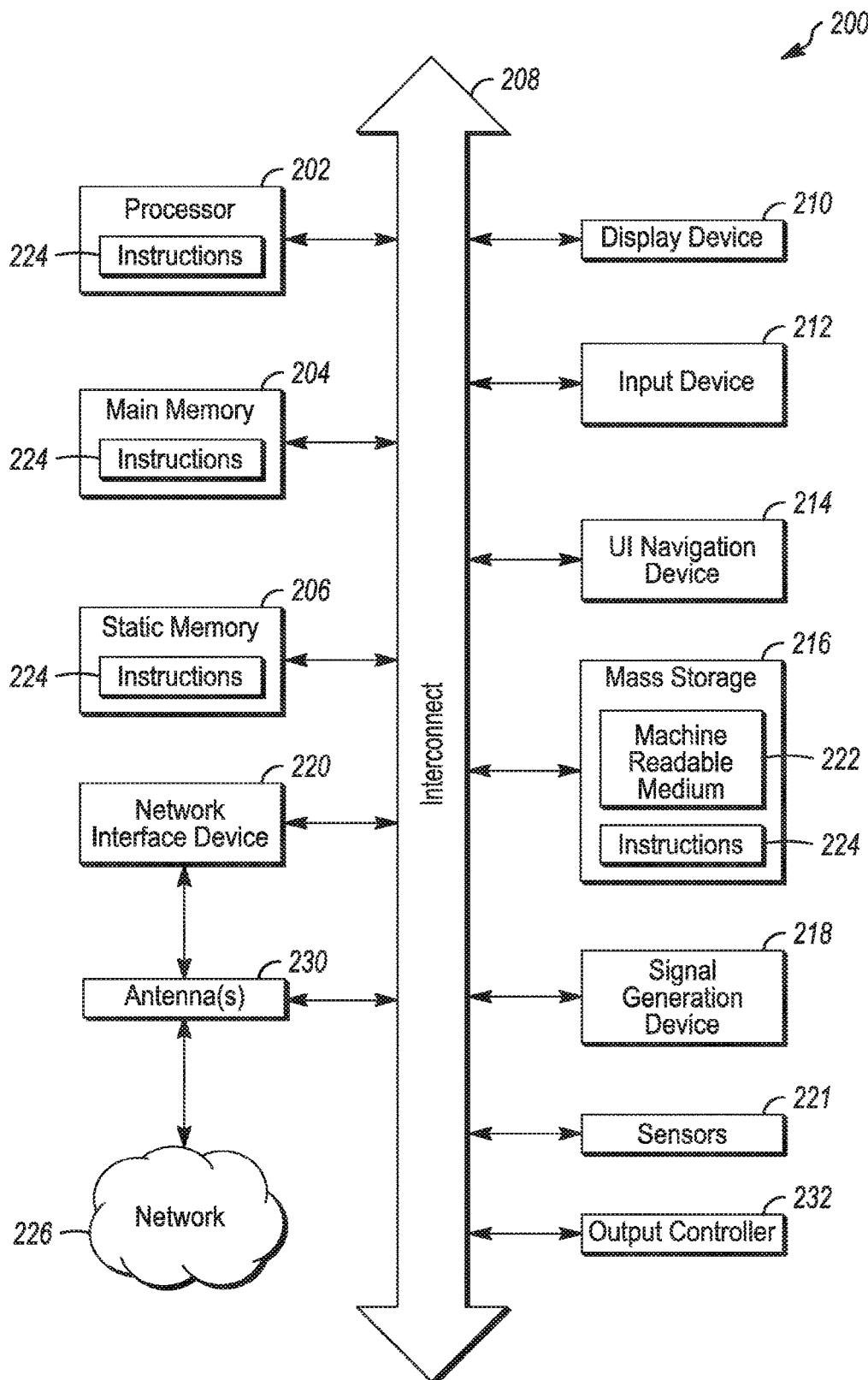
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®). IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
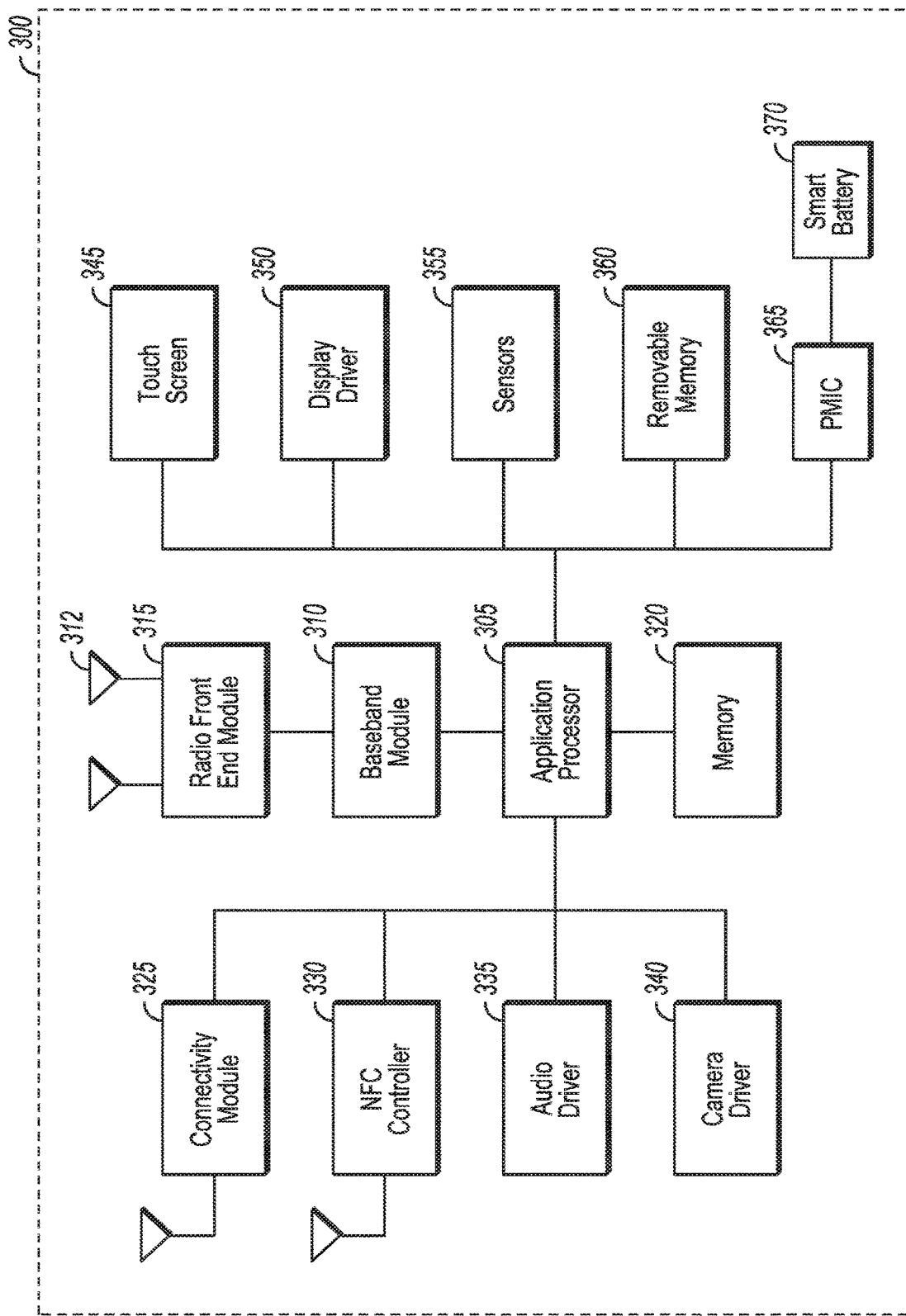
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
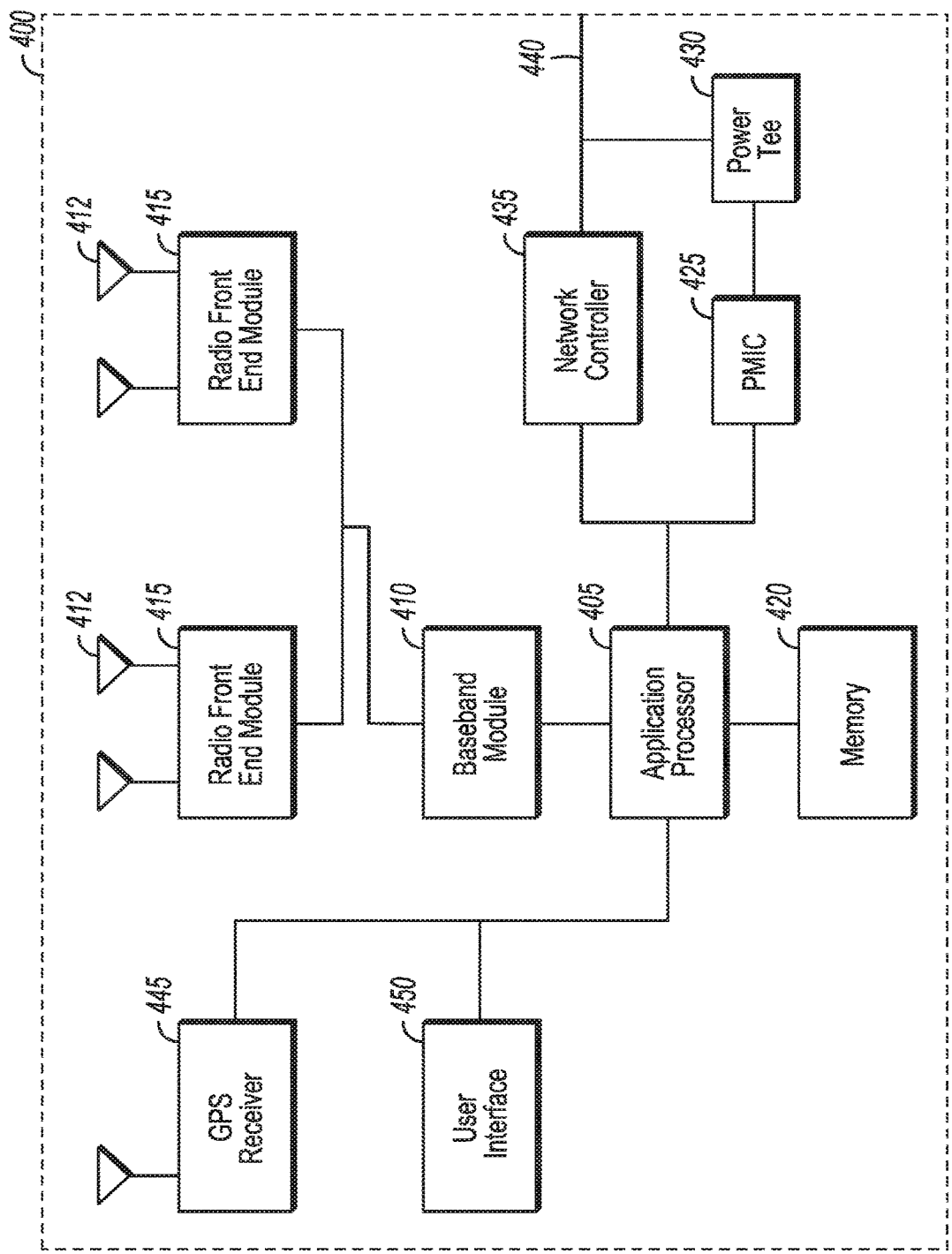
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose 10, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
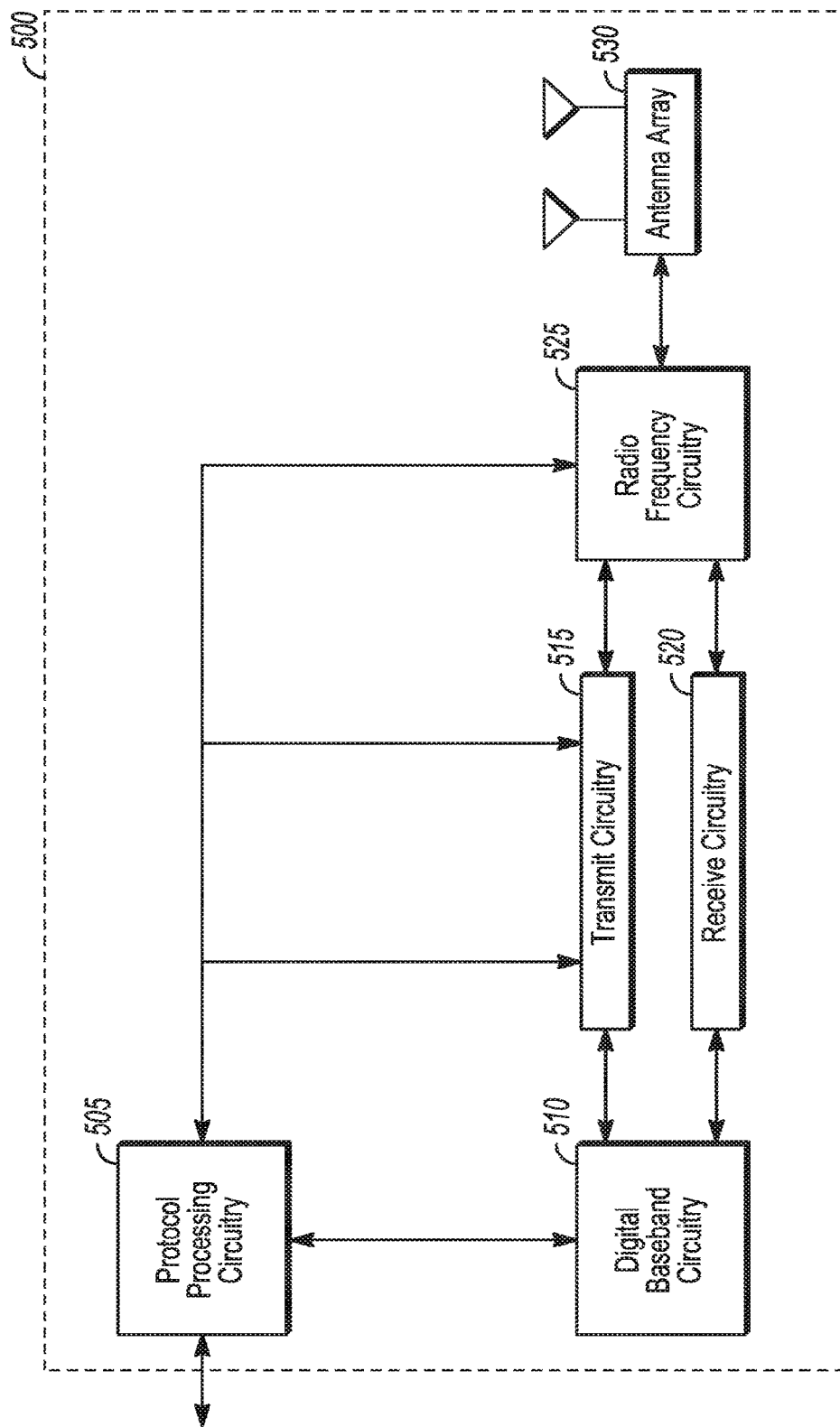
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
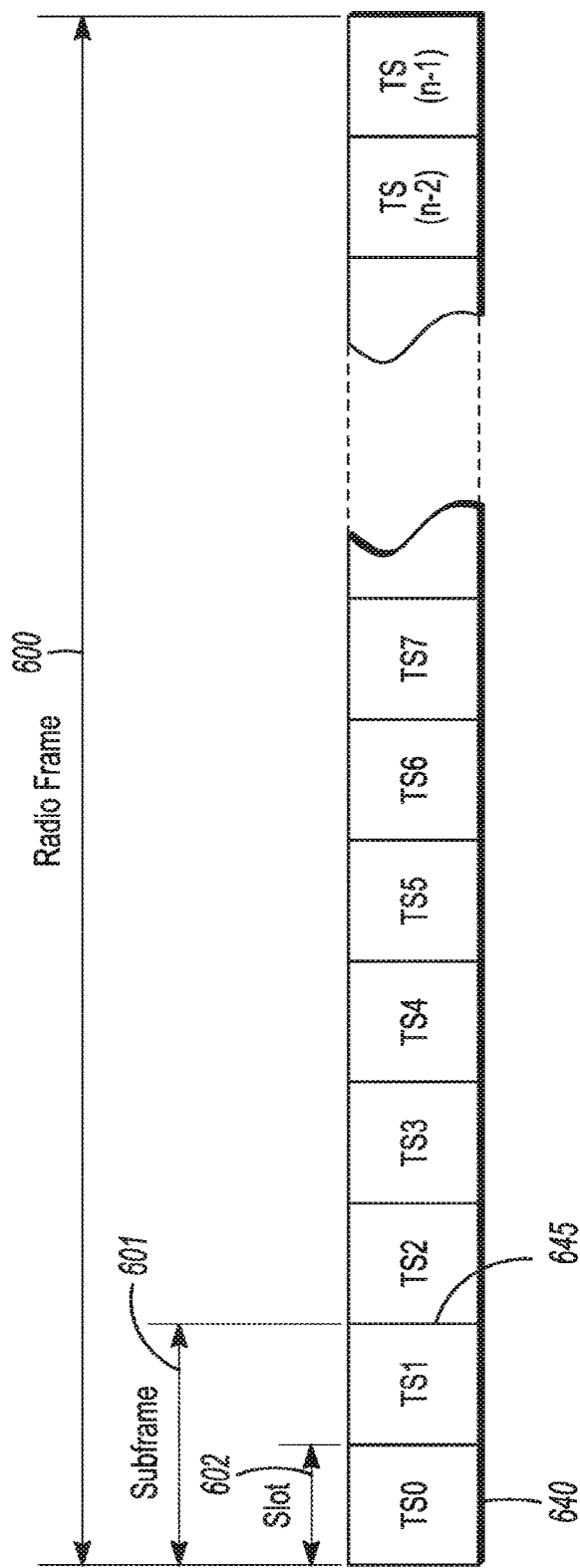
FIG. 6 illustrates an example of a radio frame structure in accordance with some embodiments.
Figure 7A:
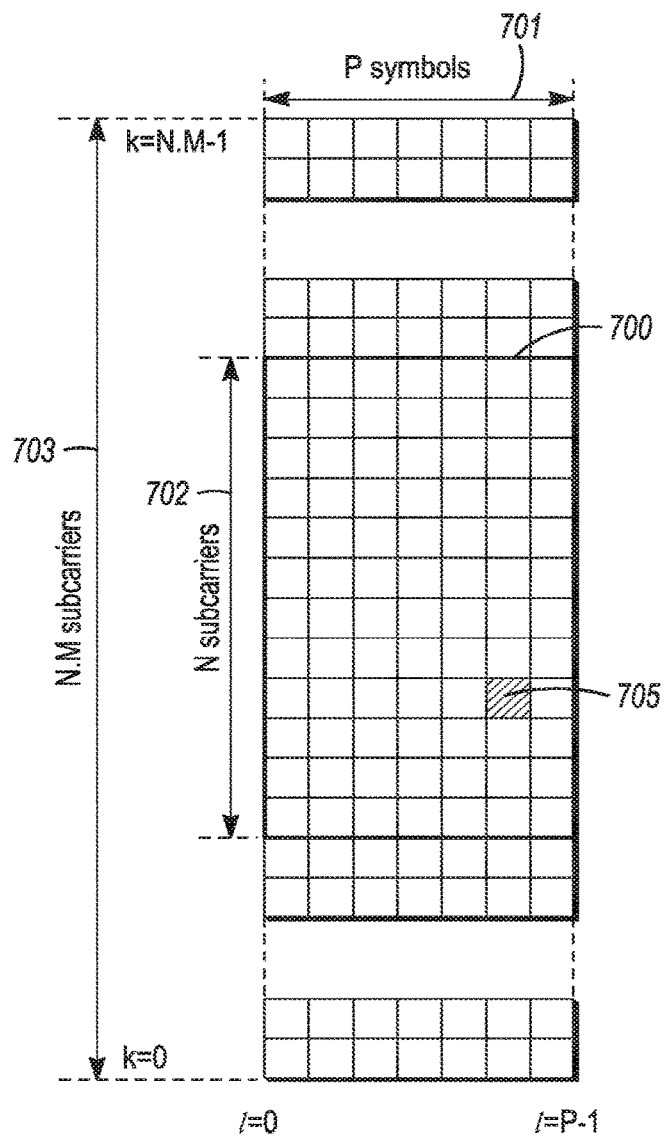
FIG. 7A and FIG. 7B illustrate example frequency resources in accordance with some embodiments.
Figure 7B:
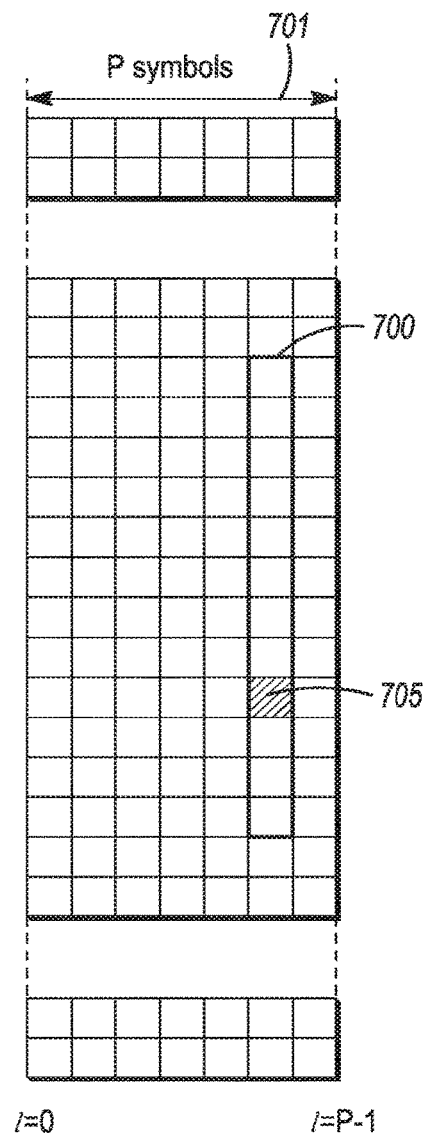

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information, sidelink control and data information. The combination of information types and direction may be selected independently for each subframe 602.

Referring to FIGS. 7A and 7B, in some aspects, a subcomponent of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N·M−1 (as indicated by 703), where N is the number of subcarriers in a resource block, and M is the number of resource blocks spanning a component carrier in the frequency domain.

In accordance with some embodiments, the gNB 105 may allocate a resource pool of physical resource blocks (PRBs) and sub-frames for vehicle-to-vehicle (V2V) sidelink transmissions. The gNB 105 may receive, from a UE 102, an uplink control message that indicates that the UE 102 requests a V2V sidelink transmission of a prioritized message. The eNB 104 may select, for the V2V sidelink transmission of the prioritized message, one or more PRBs of the resource pool and one or more sub-frames of the resource pool. The gNB 105 may transmit, to the UE 102 and to other UEs 102, a downlink control message that indicates: the selected PRBs, the selected sub-frames, and that the other UEs 102 are to mute sidelink transmissions in the selected PRBs in the selected sub-frames to enable the V2V sidelink transmission of the prioritized message. These embodiments are described in more detail below.

Figure 8:
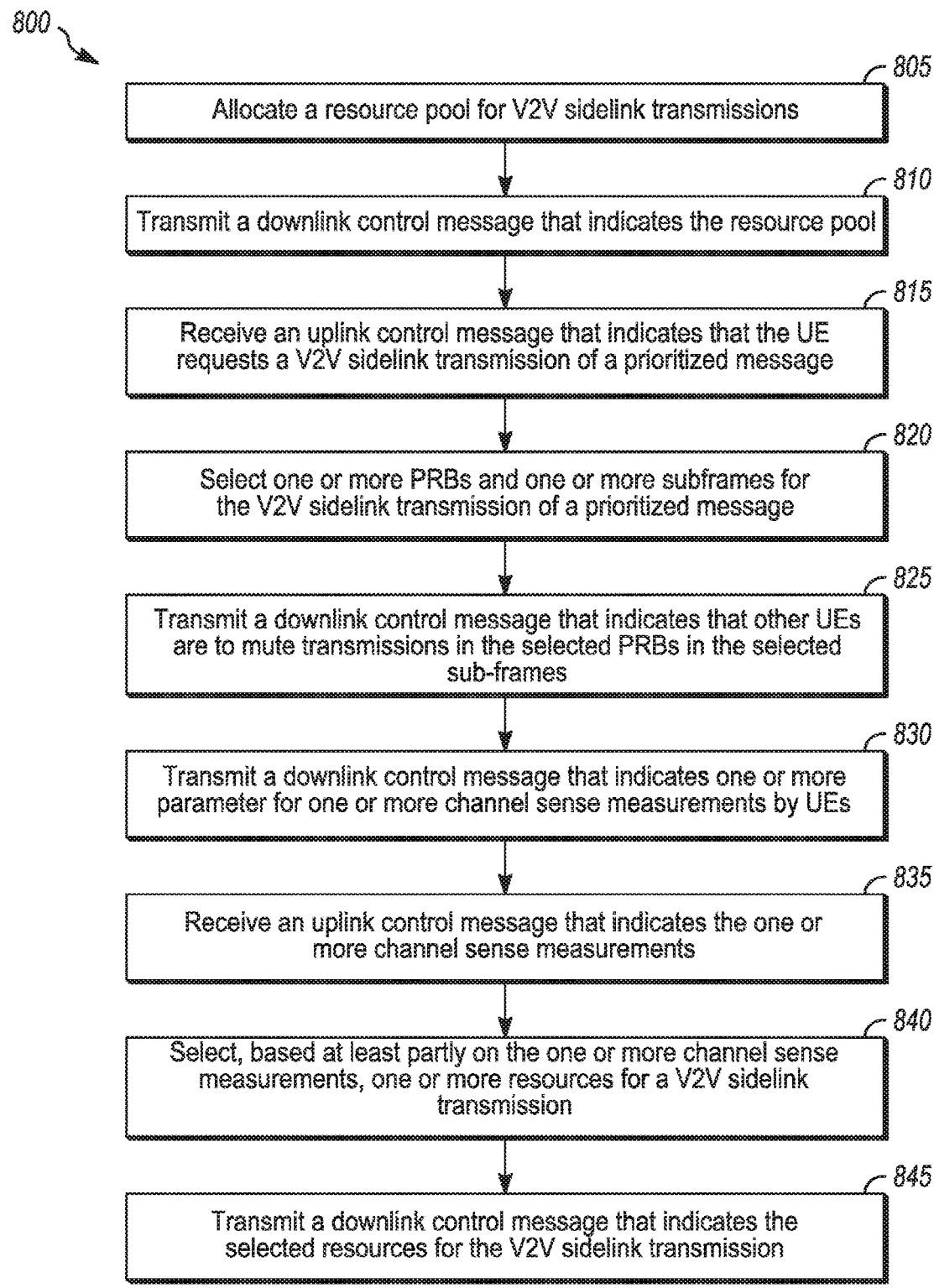
FIG. 8 illustrates the operation of a method of communication in accordance with some embodiments.
Figure 9:
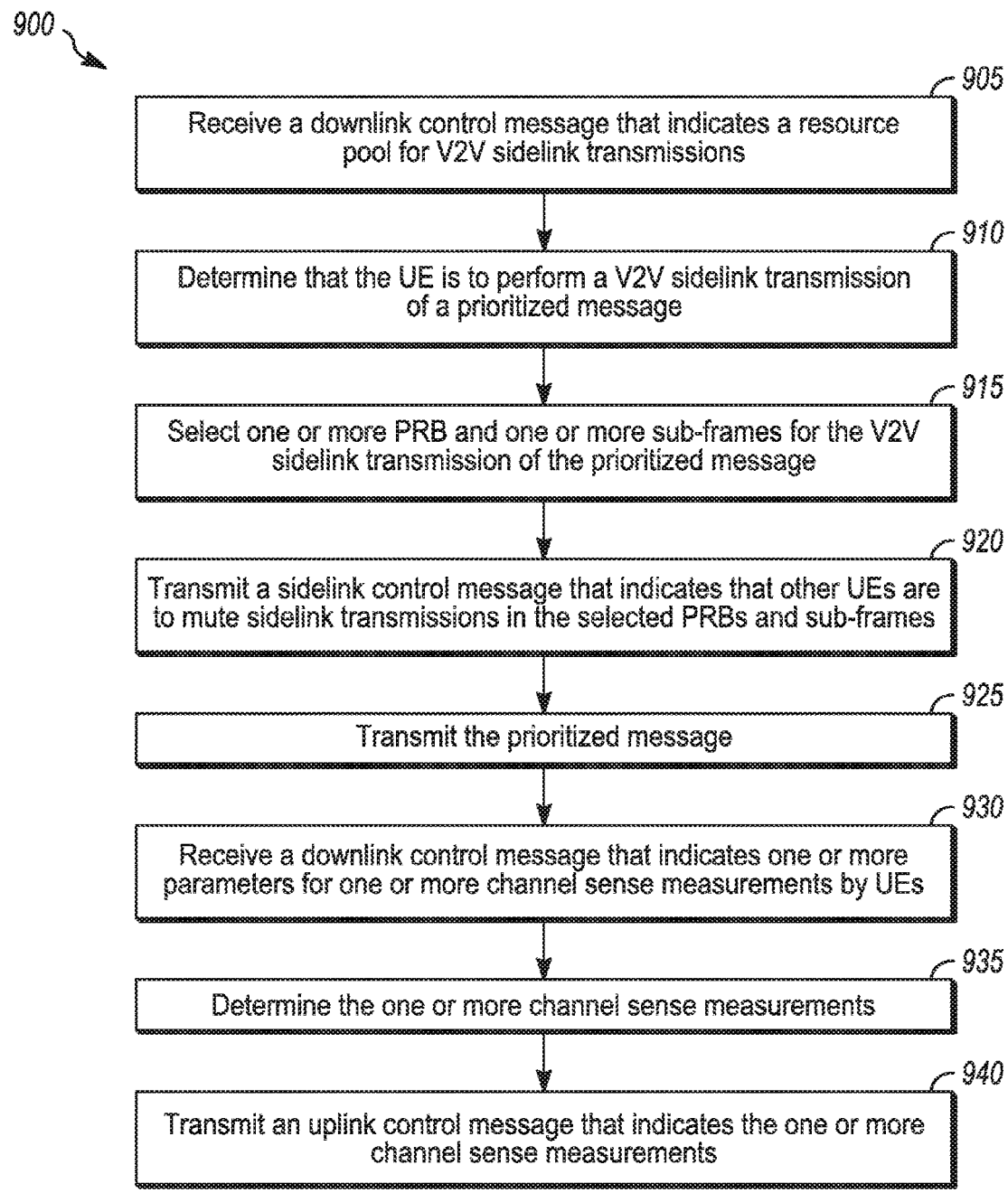
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. In describing the methods 800 and 900, reference may be made to one or more of FIGS. 1-13, although it is understood that the methods 800 and 900 may be practiced with any other suitable systems, interfaces and components. In some cases, descriptions herein of one or more of the concepts, operations and/or techniques regarding one of the methods described herein (800, 900 and/or other) may be applicable to at least one of the other methods described herein (800, 900 and/or other).

Some embodiments of the method 800 may include additional operations in comparison to what is illustrated in FIG. 8, including but not limited to operations described herein. Some embodiments of the method 800 may not necessarily include all of the operations shown in FIG. 8. In addition, embodiments of the method 800 are not necessarily limited to the chronological order that is shown in FIG. 8. In some embodiments, a gNB 105 may perform one or more operations of the method 800, but embodiments are not limited to performance of the method 800 and/or operations of it by the gNB 105. Accordingly, although references may be made to performance of one or more operations of the method 800 by the gNB 105 in descriptions herein, it is understood that the eNB 104 and/or UE 102 may perform one or more operations that may be the same as, similar to and/or reciprocal to one or more of the operations of the method 800, in some embodiments.

Some embodiments of the method 900 may include additional operations in comparison to what is illustrated in FIG. 9, including but not limited to operations described herein. Some embodiments of the method 900 may, not necessarily include all of the operations shown in FIG. 9. In addition, embodiments of the method 900 are not necessarily limited to the chronological order that is shown in FIG. 9. In some embodiments, a UE 102 may perform one or more operations of the method 900, but embodiments are not limited to performance of the method 900 and/or operations of it by the UE 102. Accordingly, although references may be made to performance of one or more operations of the method 900 by the UE 102 in descriptions herein, it is understood that the eNB 104 and/or gNB 105 may perform one or more operations that may be the same as, similar to and/or reciprocal to one or more of the operations of the method 900, in some embodiments.

While the methods 800 and 900 and other methods described herein may refer to eNBs 104, gNBs 105 or UEs 102 operating in accordance with 3GPP standards, 5G standards. NR standards and/or other standards, embodiments of those methods are not limited to just those eNBs 104, gNBs 105 or UEs 102 and may also be practiced on other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 and other methods described herein may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the messages described herein may be included in a standard and/or radio-protocol, including but not limited to Third Generation Partnership Project (3GPP), 3GPP Long Term Evolution (LTE), Fourth Generation (4G). Fifth Generation (5G). New Radio (NR) and/or other. The scope of embodiments is not limited to usage of elements that are included in standards, however.

At operation 805, the gNB 105 may allocate a resource pool for vehicle-to-vehicle (V2V) sidelink transmissions. In some embodiments, the gNB 105 may allocate the resource pool for gNB-controlled (including but not limited to mode-3) vehicle-to-vehicle (V2V) sidelink transmissions in accordance with resource selection by the gNB 105. In some embodiments, the gNB 105 may allocate the resource pool for UE-autonomous (including but not limited to mode-4) V2V sidelink transmissions in accordance with autonomous resource selection by UEs 102. In some embodiments, the gNB 105 may allocate the resource pool for a combination of mode-3 V2V sidelink transmissions and mode-4 V2V sidelink transmissions.

In some embodiments, the resource pool may include time resource and/or frequency resources. In a non-limiting example, the resource pool may include one or more physical resource blocks (PRBs) or frequency sub-channels and one or more sub-frames in time. In some embodiments, the resource pool may include contiguous frequency resources and/or PRBs, although the scope of embodiments is not limited in this respect. In some embodiments, the resource pool may include contiguous time resources and/or sub-frames, although the scope of embodiments is not limited in this respect.

It should be noted that descriptions herein of some operations and/or techniques may refer to PRBs/sub-channels and sub-frames, but such references are not limiting. In some embodiments, other time resources and/or frequency resources may be used in one or more of those operations and/or techniques.

At operation 810, the gNB 105 may transmit a downlink control message that indicates the resource pool. In some embodiments, the downlink control message may indicate PRBs and/or sub-frames of the resource pool, although the scope of embodiments is not limited in this respect. Any suitable information that indicates the resource pool may be included in the downlink control message.

At operation 815, the gNB 105 may receive an uplink control message that indicates that the UE requests a V2V sidelink transmission of a prioritized message. In a non-limiting example, the prioritized message may be an emergency message. In another non-limiting example, the prioritized message may be of a priority level that is "high" in some sense, such as: relatively high, higher than a threshold, higher than an average priority and/or other.

In some embodiments, the uplink control message may indicate one or more of: a transmission period for the V2V sidelink transmission of the prioritized message, a number of PRBs for the V2V sidelink transmission of the prioritized message, a buffer status report and/or other.

In some embodiments, the uplink control message may be included in a physical uplink shared channel (PUSCH). In some embodiments, the uplink control message may be a physical uplink control channel (PUCCH). The PUSCH and/or PUCCH may be included in a 3GPP standard, in some embodiments. It should be noted that embodiments are not limited to usage of the path switch trigger message in this operation and/or other operations described herein, as any suitable messages may be used.

At operation 820, the gNB 105 may select resources for a V2V sidelink transmission. In some embodiments, the gNB 105 may select resources for the V2V sidelink transmission of the prioritized message. In some embodiments, the gNB 105 may select, for the V2V sidelink transmission of the prioritized message: one or more PRBs of the resource pool, one or more sub-frames of the resource pool or a combination thereof. In some embodiments, the gNB 105 may select resources that may not necessarily be contiguous in time and frequency. For instance, the resources may include first PRBs in a first symbol or subframe and second PRBs in a second symbol or subframe, and the first PRBs may be different from the second PRBs.

In some embodiments, the gNB 105 may select the resources (such as PRBs and sub-frames) for the V2V sidelink transmission of the prioritized message based at least partly on information included in the uplink control message. In some embodiments, the gNB 105 may select the resources (such as PRBs and sub-frames) for the V2V sidelink transmission of the prioritized message based at least partly on channel sense measurements (such as those described regarding operation 940). In some embodiments, one or more other factors may be used by the gNB 105 for the selection of resources, in addition to or instead of the factors described above.

It should be noted that one or more operations of methods described herein (such as 800, 900 and/or others) may be described for cases in which a V2V sidelink transmission of prioritized message is to be used. Such operations may include, but are not limited to, resource selection, indication of selected resources and/or others. However, such descriptions are not limiting, as one or more of those operations may be applicable to cases in which V2V sidelink transmissions are used for messages that may not necessarily be prioritized messages, in some embodiments.

At operation 825, the gNB 105 may transmit a downlink control message that indicates that other UEs 102 are to mute transmissions in the selected PRBs in the selected sub-frame. In some embodiments, the downlink control message may further indicate one or more of; the selected PRBs, the selected sub-frames, a time duration for which the other UEs 102 are to mute the sidelink transmissions in the selected PRBs in the selected sub-frames and/or other information.

In some embodiments, the gNB 105 may transmit the downlink control message to the UE 102. In some embodiments, the gNB 105 may transmit the downlink control message to other UEs 102. In some embodiments, the gNB 105 may transmit the downlink control message to the UE 102 and to other UEs 102.

In a non-limiting example, the downlink control message may be a medium access control (MAC) control element (CE) included in a physical downlink shared channel (PDSCH). In another non-limiting example, the downlink control message may be a physical downlink control channel (PDCCH). The PDCCH may include a downlink control information (DCI) that indicates the selected resources (such as selected PRBs, selected sub-frames and/or other). In another non-limiting example, the downlink control message may be a broadcast system information block (SIB).

At operation 830, the gNB 105 may transmit a downlink control message that indicates one or more parameters for one or more channel sense measurements by UEs 102. Example parameters for the channel sense measurements include, but are not limited to: a number of PRBs for the measurements, a number of sub-frames for the measurements and/or other.

In some embodiments, the channel sense measurement may be a sidelink received signal strength indicator (S-RSSI). Other measurements may be used, including but not limited to a signal-to-noise ratio (SNR), a reference signal received power (RSRP), a reference signal received quality (RSRQ), a channel busy ratio (CBR), or measurements to report candidate subset of resources for selection or subset of resources that should not be used (unavailable/ excluded) for transmission and/or other.

At operation 835, the gNB 105 may receive an uplink control message that indicates the one or more channel sense measurements. Any suitable type of uplink control message, such as a PUCCH. PUSCH and/or other, may be used.

At operation 840, the gNB 105 may select, based at least partly on the one or more channel sense measurements, one or more resources for a V2V sidelink transmission. In some embodiments, the gNB 105 may transmit a downlink control message (including but not limited to messages described herein regarding operation 825) to indicate the resources selected at operation 840.

In a non-limiting example of resource selection, the channel sense measurement may be related to first resources of the resource pool. The gNB 105 may select second resources of the resource pool for the mode-3 V2V sidelink transmission. The gNB 105 may determine, based at least partly on the channel sense measurement, whether the first resources are unavailable for mode-3 V2V sidelink transmissions. If it is determined that the first resources are unavailable for mode-3 V2V sidelink transmissions, the gNB 105 may select the second resources from candidate resources that exclude the first resources.

In some embodiments, the gNB 105 may be arranged to operate in accordance with a Third Generation Partnership Project (3GPP) protocol. In some embodiments, the gNB 105 may be configured for mode-3 operation, wherein the gNB 105 is to select time resources and/or frequency resources (such as PRBs and sub-frames of the resource pool) for a V2V sidelink transmission. In some embodiments, uplink control messages may be received by the gNB 105 over an uplink Uu interface and downlink control messages may be transmitted by the gNB 105 over a downlink Uu interface.

In some embodiments, the gNB 105 may transmit downlink control signaling to instruct UEs 102 to perform one or more of monitor one or more sidelink resource pools; sense the sidelink resource pools; perform radio-layer measurements within the sidelink resource pools; determine candidate resources of the sidelink resource pools that are available for sidelink transmission (for instance, the best M candidate resources may be determined, wherein M≥1); determine resources of the sidelink resource pools that are to be excluded from selection for the sidelink transmissions; determine resources of the sidelink resource pools that are not available for the sidelink transmissions.

In some embodiments, radio-layer parameters (for the above operations and/or other operations) may be configured by the gNB 105 using signaling (including but not limited to RRC signaling) that may indicate one or more of: triggering conditions for measurement and/or reporting of results to the gNB 105, a pre-configured reporting format; a pre-defined reporting format; and/or other.

In some embodiments, triggering conditions may be based on one or more thresholds for measurements related to detection of sidelink transmissions. Example measurements include, but are not limited to, received power and reference signal received power (RSRP). For instance, if a measurement exceeds a threshold, a report may be triggered. In some embodiments, triggering conditions may be based on one or more thresholds for priority levels of detected sidelink signals. For instance, if the priority level of a detected signal is above a threshold, a report may be triggered. A combination of the above (and/or other) may be used, in some embodiments. For instance, a report may be triggered if a priority of a detected sidelink transmission is greater than a first threshold and if a measurement (such as received power, RSRP and/or other) of the detected sidelink transmission is greater than a second threshold, a report may be triggered.

In some embodiments, a pre-configured reporting format and/or pre-defined reporting format may include one or more of; a candidate resource set; a subset of the best selected resources from candidate resource set recommended for transmission; resources that should not be used for scheduling sidelink transmissions; resources for which it is recommended to refrain from allocation for scheduling of sidelink transmissions; and/or other. In a non-limiting example, the report may be sent over PUCCH or PUSCH in the form of MAC CE or other types of UL control signaling.

In some embodiments, an apparatus of a gNB 105 may comprise memory. The memory may be configurable to store information identifying selected PRBs and selected sub-frames. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to selection of resources for the V2V sidelink transmission of the prioritized message. The apparatus of the gNB 105 may include a transceiver to receive an uplink control message and to transmit a downlink control message. The transceiver may transmit and/or receive other blocks, messages and/or other elements.

At operation 905, the UE 102 may receive a downlink control message that indicates a resource pool for V2V sidelink transmission.

At operation 910, the UE 102 may determine that the UE is to perform a V2V sidelink transmission of a prioritized message. In a non-limiting example, the UE 102 may determine that the prioritized message is to be transmitted over the V2V sidelink based at least partly on an indicator generated by an application layer of the UE 102.

At operation 915, the UE 102 may select resources for the V2V sidelink transmission of the prioritized message. In some embodiments, the UE 102 may select one or more PRB and one or more sub-frames for the V2V sidelink transmission of the prioritized message.

At operation 920, the UE 102 may transmit a sidelink control message that indicates that other UEs 102 are to mute sidelink transmissions in the selected/indicated set of PRBs and sub-frames. In some embodiments, the sidelink control message may further indicate one or more of: the selected PRBs, the selected sub-frames, a time duration for which the other UEs 102 are to mute the sidelink transmissions in the selected PRBs in the selected sub-frames and/or other information.

In a non-limiting example, the sidelink control message may be included in a physical sidelink shared channel (PSSCH). In another non-limiting example, the sidelink control message may be a physical sidelink control channel (PSCCH) that includes a sidelink control information (SCI) that includes the selected resources (such as the selected PRBs and the selected sub-frames). Embodiments are not limited to these examples, as other types of sidelink control messages may be used.

At operation 925, the UE 102 may transmit the prioritized message in the selected resources.

At operation 930, the UE 102 may receive a downlink control message that indicates one or more parameter for one or more channel sense measurements by UEs 102. At operation 935, the UE 102 may determine the one or more channel sense measurements. At operation 940, the UE 102 may transmit an uplink control message that indicates the one or more channel sense measurements.

In some embodiments, one or more of operations 930-940 may be performed in accordance with mode-3 operation. In some embodiments, the UE 102 may operate in accordance with mode-4 operation and may not necessarily perform one or more of operations 930-940. For instance, channel sensing in accordance with mode-4 operation may be performed locally by the UE 102 without an exchange of messages (such as from the gNB 105) that indicate such measurements.

In some embodiments, the UE 102 may be arranged to operate in accordance with a Third Generation Partnership Project (3GPP) protocol. In some embodiment, the UE 102 may be configured for mode-4 operation, wherein the UE 102 is to select the resources (such as the PRBs and the sub-frames) for V2V sidelink transmissions.

It should be noted that some embodiment may not necessarily include all operations shown in FIG. 9. For instance, if the UE 102 operates in accordance with mode-4 operation, the UE 102 may not necessarily perform one or more of operations 930-940.

In some embodiments, an apparatus of a UE 102 may comprise memory. The memory may be configurable to store at least a portion of the prioritized message. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to selection of resources for a V2V transmission. The apparatus of the UE 102 may include a transceiver to transmit the sidelink control message. The transceiver may transmit and/or receive other blocks, messages and/or other elements.

In some embodiments, techniques and/or operations described herein may be applicable for implementation in Cellular V2X systems including LTE V2X and NR V2X technologies. In some cases, such techniques and/or operations may enable improvements in comparison to other systems, such as a higher reliability of high priority vehicular message transmission, a reduced V2X system reaction time and/or other.

In some V2X use cases, such as cases in which a traffic jam occurs due to an accident and/or other event(s), a number of cars in a same area may be relatively large. A probability of message collision for vehicle to vehicle (V2V) communication may be high in cases in which a density of vehicles in a same geographical area is high. A communication range of the sidelink V2V message transmission may be reduced in these and other scenarios.

In some cases, high priority messages and/or indications may be used. In a non-limiting example scenario, a safety car (police, medical and/or other) may transmit emergency messages and/or indications to other cars. For instance, the safety car may indicate to other cars to switch lanes due to emergency or align trajectory. In some embodiments, a mechanism for transmission of "high priority" packets may be used. In some embodiments, a UE 102 (and/or other device) may indicate to one or more other UEs 102 (and/or other devices) one or more of the following: that the other UEs 102 are to "mute" transmission, that the other UEs 102 are to exclude certain resources from candidate resources, that the other UEs 102 are to stop transmission on indicated resources during a time interval; and/or other. These mechanisms and/or other mechanisms may be applicable to various scenarios, including the above scenarios.

In some embodiments, a "mute" control signaling procedure (such as a mute announcement/request and/or other) may be used. In some cases, such a procedure may be used for notification of other UEs 102 to stop transmitting in order for higher priority safety message to reach neighboring UEs 102. The higher priority safety message may be transmitted on a "muted" resource in which other transmissions are to be muted. In some embodiments, the muted resource may be a dedicated resource, although the scope of embodiments is not limited in this respect. An indication mechanism may be signaled by the gNB 105, UE 102 and/or other device. The techniques described herein may be applicable to Mode-3 scenarios (in which the gNB 105 controls resource allocation), Mode-4 scenarios (in which autonomous resource allocation by one or more UEs 102 is used) and/or other scenarios.

In some embodiments, the muted resource may be restricted to a subset of resource blocks (RBs)/sub-channels and/or subframes. In some embodiments, the muted resource may be held/restricted for a limited duration of time. In some embodiments, a sidelink relaying mechanism may be used by the UE 102 for one or more of the following: to receive high priority messages, to retransmit high priority messages to other devices, to disseminate information (such as a number of hops for repetition/retransmission and/or other information) about resources prohibited for selection and reservation by other UEs 102; and/or other operation(s).

In some embodiments, a sidelink mute/reservation request may be used. In a non-limiting example, the sidelink mute/reservation request may be based on eNB/gNB control signaling, although the scope of embodiments is not limited in this respect. The gNB 105 may indicate a mute request to UEs 102 based on the network command or by request from served UEs 102 that request resources for high priority sidelink transmission with high reliability (for instance, mission critical traffic with low latency and high reliability requirements). In this scenario, it may be assumed that UEs 102 performing V2V sidelink communication on certain frequency channel also monitor Uu air-interface to receive commands from eNBs 104 and/or gNBs 105. Different approaches are possible, including but not limited to single cell point to multipoint (SC-PTM), multicast broadcast single frequency network (MBSFN), basic DL communication and/or other.

From a physical layer perspective, such an indication in the downlink may be signaled in a PDCCH, a PDSCH and/or or a PMCH (which will be described below), although other elements may be used. In some embodiments, the gNB 105 may transmit a PDCCH that indicates a mute operation. In some embodiments, the gNB 105 may transmit a PDSCH that indicates a mute operation. In some embodiments, the gNB 105 may transmit a PMCH that indicates a mute operation. Embodiments are not limited to usage of these elements (PDCCH, PDSCH, PMCH) for indication of the mute operation, as other elements may be used in some embodiments.

In some embodiments, including but not limited to embodiments in which the PDCCH is used for a mute indication, an existing DL DCI format and/or other DL DCI format may be defined to carry physical layer indication of resources to mute sidelink transmissions. In some cases, a reuse of legacy DCI formats (such as 5 or 5A in a 3GPP LTE standard and/or other format) may be a preferred design option to avoid increase in blind decoding attempts. A dedicated RNTI (such as RSRV_RNTI, MUTE_RNTI and/or other) may be allocated/configured to enable the UE 102 to monitor DCI transmissions in a common search space (or group common search space or CORE_SET) and to receive a mute command from the gNB 105. Alternatively, V2X or SC-PTM RNTIs allocated for a common search space may be used.

In some embodiments, including but not limited to embodiments in which the PDCCH is used for a mute indication, the content of DCI format carrying mute information may indicate sidelink resources in which UEs 102 are to drop transmissions and are to exclude these resources from candidate resources for selection. In some embodiments, the eNB 104/gNB 105 mute command through PDCCH control signaling may look similar to a sidelink grant in eNB 104 and/or gNB 105 controlled resource allocation mode. In some embodiments, the eNB 104/gNB 105 mute command through PDCCH control signaling may comprise one or more of the following: priority information, for instance that transmissions with lower priority are to be muted on indicated resources and the indicated resources are to be excluded those from candidates resources for selection; frequency resource location information, including but not limited to a set of frequency sub-channels, sub-bands or physical resource blocks; time resource location information, including but not limited to a set of subframes or slots periodically occurring in time; resource reservation interval/period, including but not limited to a period of muted resource occasions; a mute/reservation interval, for instance a timer configuration to indicate for how long the command is supposed to be valid (otherwise eNB 104/gNB 105 may periodically signal this command); a sidelink resource pool ID, for instance which sidelink resource pool should not be used for transmission, wherein this principle may rely on dynamic activation/deactivation of pre-configured sidelink resource pools available for transmission; resource allocation mode indication, for instance whether the mute command is applicable to Mode-3 (eNB 104/gNB 105 controlled UEs 102) or to Mode-4 (UEs 102 using autonomous resource selection) or both modes of operation; location information, for instance an ID of geographical area/zone for which this command was issued; a sidelink carrier ID, for instance an indication of sidelink carrier or carrier set in which resources are to be muted; a hop counter for resource reservation/mute request (for instance in cases in which signaling is relayed by a UE 102, it should increment relay hop counter); and/or other information.

In some embodiments, including but not limited to embodiments in which the PDCCH is used for a mute indication, the UE 102 may perform one or more of the following behaviors. The target UE 102, upon reception of DCI command, may be expected to mute transmission on indicated sidelink resources and resume use of these resources upon command completion/expiration or additional eNB/gNB signaling to release these resources. The target UE 102 may be determined by RNTI, geographical location information and/or other information. The target UE 102, if configured, may relay this information on sidelink so that UEs 102 are aware about the mute operation on the subset of sidelink resources. The target UE 102 may use SCI signaling in PSCCH. MAC CE delivered through PSSCH transmission and/or other element for the relay. The UE 102 may request the gNB 105 to send this mute command and provide a UE 102 report with assistance information including one or more of: a period of transmission, an amount of frequency resources or buffer status report, priority information, location information, and/or other information. The UE 102 may be preconfigured through RRC signaling with system parameters to execute such system behavior, such as one or more of: timer information indicating validity of command, resource pools for which the command is applicable, component carriers in which such operation may be enabled, applicable resource allocation modes, and/or other.

In some embodiments, including but not limited to embodiments in which the PDCCH is used for a mute indication, the eNB 104/gNB 105 may perform one or more of the following behaviors. The eNB 104/gNB 105 may configure UEs 102 to enable functionality of sidelink resource mute/reservation. The eNB 104/gNB 105 may generate resource mute command upon request from network or UEs 102 and may signal it to UEs 102 in cell area and may signal it in PDCCH/PDSCH/PMCH. The eNB 104/gNB 105 may signal these commands periodically until the mute and resource reservation is valid. The eNB 104/ gNB 105 may exchange control information about muted resources with neighbor eNBs 104/gNBs 105 through X2AP interface.

In some cases, a mechanism based on PDCCH indication (including but not limited to a mechanism similar to the one described above) may provide a relatively fast system reaction time and may be used for latency critical applications.

In some cases, including but not limited to cases in which a payload size of DCI is not sufficient to enable mute operation, the PDSCH may be used for the indication. This mode of operation may be implemented based on SC-PTM framework or using unicast or group common DL transmissions, although the scope of embodiments is not limited in this respect. In some embodiments, the indication of muted/ reserved resources may reuse sidelink resource pool configuration principle or sidelink grant used in case of eNB/ gNB controlled resource allocation mode. In some cases, including but not limited to cases in which resource pool configuration signaling is reused for indication of muted/ reserved resources, the UE 102 may use pre-configured resource pools for sidelink transmission, may drop transmission and/or may exclude from resource selection overlapped sidelink resources.

In some embodiments, including but not limited to embodiments in which the PDSCH is used for a mute indication, MAC Control element (CE) (including but not limited to a V2X MAC CE) may be used for the indication. Embodiments are not limited to usage of this element for the mute indication, however, as other elements may be used in some embodiments. In some embodiments, the V2X MAC CONTROL CE may be transmitted in a unicast or a broadcast mode to vehicles in a given area. The MAC control CE may include one or more of the following: a command type, such as whether to mute or to release mute; priority information, for instance, transmissions with lower priority on indicated resources are to be muted, the indicated resources are to be excluded from candidates resources for selection and/or other; frequency resource location information, such as one or more of a set of frequency sub-channels, sub-bands or physical resource blocks; a list of identifiers (IDs), such as destination-layer2-ids and/or other; time resource location information, such as a set of subframes or slots periodically occurring in time; resource reservation interval/ period, for instance a period of muted resource occasions; a mute/reservation interval, for instance a timer configuration to indicate for how long the command is supposed to be valid (otherwise eNB 104/gNB 105 may periodically signal this command); sidelink resource pool ID, for instance which sidelink pool should not be used for transmission (this principle may rely on dynamic activation/deactivation of pre-configured sidelink resource pools available for transmission, in some cases); resource allocation mode indication, for instance whether mute command is applicable to Mode-3 (eNB 104/gNB 105 controlled UEs 102) or to Mode-4 (UEs 102 using autonomous resource selection) or both modes of operation; location information, for instance an ID of a geographical area/zone for which the mute command is, including but not limited to a zone ID of a 3GPP LTE standard; a sidelink carrier ID, for instance an indication of sidelink carrier(s) and/or carrier set in which resources are to be muted; a hop counter for resource reservation, mute request and/or other; and/or other information.

In some embodiments, a system information broadcast (SIB) may include one or more of the following: a mute indication, a mute command, information related to a mute operation (including but not limited to information related to a mute operation that may be included in a MAC CE described herein); and/or other information. In a non-limiting example, an extension of the SIB 21 and/or other SIB may be used. The SIB may be broadcast. The SIB may be received by multiple vehicles/devices.

In some embodiments, a UE 102 may receive a MAC CE or SIB that indicates a mute command. The UE 102 may mute transmission on indicated sidelink resources. The UE 102 may resume usage of those resources. For instance, the UE 102 may resume usage of those resources upon command completion or based on additional eNB 104/gNB 105 signaling or based on other event(s).

In some embodiments, the target UE 102 may be determined by RNTI, SL-V-RNTI, geographical location information and/or other information. The target UE 102 may, if configured, relay some information about the sidelink, which may enable multiple UEs 102 to be aware about a mute operation on the subset of sidelink resources. The target UE 102 may use SCI signaling in PSCCH. MAC CE delivered through PSSCH transmission and/or other element for the relay. A priority of the MAC CE may be configured by eNB 104/gNB 105 signaling or may be pre-configured.

In some embodiments, the UE 102 may request that the gNB 105 send a mute command and/or a UE report with assistance information. The assistance information may be related to a mute operation, such as one or more of: a period of transmission, an amount of frequency resources, a buffer status report, priority information, location information and/ or other.

In some embodiments, the UE 102 may be preconfigured (through RRC signaling and/or other) with system parameters to execute such system behavior. Such information may include one or more of: timer information indicating validity of the mute command, resource pools for which the mute command is applicable, component carriers in which such operation may be enabled, applicable resource allocation modes and/or other.

In some embodiments, including but not limited to embodiments in which the SIB is used for a mute indication, the eNB 104/gNB 105 may perform one or more of the following behaviors. The eNB 104/gNB 105 may configure UEs 102 to enable functionality of sidelink resource mute/ reservation. The eNB 104/gNB 105 may generate resource mute command upon request from network or UEs 102 and may signal it to UEs 102 in cell area and may signal it in PDCCH/PDSCH/PMCH. The eNB 104/gNB 105 may signal these commands periodically until the mute and resource reservation is valid. The eNB 104'gNB 105 may exchange control information about muted resources with neighbor eNBs 104/gNBs 105 through X2AP interface.

In some embodiments, including but not limited to embodiments in which the PMCH is used for a mute indication, the PMCH based indication may assume utilization of MBMS protocols to carry information about sidelink resource mute/reservation across multiple cells using MBSFN transmissions. In some embodiments, a Temporary Mobile Group Identity (TMGI) may be configured for service notification related to V2X. This TMGI may be associated with a V2X configuration sidelink. An application that handles this service may be configured with the enhance resource reservation configuration. In some embodiments, the PMCH may include one or more of the following: a mute indication, a mute command, information related to a mute operation (including but not limited to information related to a mute operation that may be included in a MAC CE described herein); and/or other information.

In some embodiments, the UE 102 may transmit control signaling and/or an element that includes a mute indication, a mute command, a sidelink mute/reservation request and/or other information related to a mute operation. Non-limiting examples of such control signaling and/or element include a PSCCH (sidelink control) channel or PSSCH (sidelink shared) channel.

In some embodiments, a mechanism to reserve/mute resources may be activated upon request from application layers. The sidelink mute and resource reservation request may be carried out through different types of sidelink signaling. For instance, upon notification from V2X stack (such as a notification that an emergency high priory message (ITS/SAE for this message priority class) is to be sent, a notification that the medium is congested and/or a notification of another event), the cellular MAC layer may send and/or request physical layer to send a message/element to indicate a mute operation for radio resource(s). The UE 102 may then or in parallel transmit the message/element. Upon receiving the message/element, a UE 102 may stop transmission on the sidelink on one or more resource blocks (RBs) indicated by the message/element. The message/element may be related to one or more RBs. The mute operation indicated by the message/element may be applicable for a finite amount of time, in some embodiments. In a non-limiting example, the message/element may be referred to, without limitation, as a "radio resource free request message."

In some embodiments, including but not limited to embodiments in which the PSCCH is used for a mute indication, an existing/legacy sidelink control information (SCI) or other SCI format may be used for one or more of the following: to indicate a mute operation, to indicate information related to the mute operation, to indicate resources for the mute operation, to reserve sidelink resources and/or other. In some cases, reuse of legacy SCI formats (including but not limited to SCI Format 1A in a 3GPP LTE standard) may simplify integration of such signaling in legacy LTE-V2V sidelink frameworks. Alternatively, other SCI formats and/or modification of legacy SCI formats may be used.

In some embodiments, including but not limited to embodiments in which the PSCCH is used for a mute indication, the SCI signaling in the PSCCH may include priority information. For instance, transmissions with lower priority are to mute transmission on indicated resources and are to exclude those resources from candidate resources for selection. In some embodiments, the SCI signaling may include frequency resource location information. For instance, a set of frequency sub-channels, sub-bands or physical resource blocks (PRBs) may be indicated. In some cases, to increase reliability and/or to avoid near-far problems at the sidelink receiver side, an entire set of available frequency resources (for sidelink communication) may be indicated as occupied so that FDM type of transmission may be precluded. In some scenarios, the TTI across all component carriers may be considered as reserved.

In some embodiments, the SCI signaling may include time resource location information. For instance, a set of subframes or slots or time transmission intervals (TTIs) periodically occurring in time may be included. In some embodiments, the SCI signaling may include a resource reservation period, for instance a period of muted/reserved resource occasions. In some embodiments, the SCI signaling may include a mute/reservation interval. For instance, a timer configuration to indicate for how long a command is supposed to be valid may be included. In some embodiments, the SCI signaling may include a sidelink resource pool ID. For instance, the SCI signaling may indicate which sidelink pool should not be used for transmission, and this may rely on dynamic activation/deactivation of pre-configured sidelink resource pools available for transmission, in some cases. In some embodiments, the SCI signaling may include a resource allocation mode indication. In a non-limiting example, the SCI signaling may indicate whether a mute command is applicable to Mode-3 (eNB 104/gNB 105 controlled UEs 102) or to Mode-4 (UEs 102 using autonomous resource selection) or to both modes of operation.

In some embodiments, the SCI signaling may include location information. For instance, the location information may include absolute or relative coordinate of UE 102, a zone ID, a radius in which UEs 102 are supposed to mute transmission and/or other information. In some embodiments, the SCI signaling may include a sidelink carrier ID. For instance, the SCI signaling may indicate a sidelink carrier or carrier set in which resources are supposed to be muted. In some embodiments, the SCI signaling may include a hop counter for resource reservation/mute request. For instance, in cases in which signaling is relayed, the UE 102 may increment a relay hop counter.

In some embodiments, for mode-3 (gNB 105 controlled) operation, a mode-3 UE 102 may request the gNB 105 to indicate resource reservation/mute through Uu air-interface. In addition, a mode-3 UE 102 may signal such indication over PSCCH. In some embodiments, for mode-4 (UE 102 autonomous) operation, a mode-4 UE 102 may signal resource reservation and mute directly in PSCCH using SCI signaling. The UE 102 may avoid reservation of resources that are already occupied by other UEs 102.

In some embodiments, for mode-3 (gNB 105 controlled) operation, a mode-3 UE 102 that detects sidelink request for mute/reservation of resource(s) on sidelink may report information about such resources to eNB 104/gNB 105 to prevent scheduling on such resources. The mode-3 UE 102 that detects sidelink request for mute/reservation of resource on sidelink may relay this information if predefined conditions for relaying are met.

In some embodiments, for mode-4 (LE 102 autonomous) operation, a mode-4 UE 102 that detects sidelink request for mute/reservation of resource on sidelink may relay this information, if predefined conditions for relaying are met (for instance, if a hop counter is below threshold or RSRP value is below threshold). The mode-4 UE 102 that detects sidelink request for mute/reservation of resource on sidelink may exclude those resources from the set of candidate resources for selection.

In some embodiments, a PSSCH indication may include a sidelink V2X MAC CONTROL CE. In some embodiments, a broadcast mode may be used, although the scope of embodiments is not limited in this respect. The MAC control CE may include one or more of the following: a command type, such as mute, mute release and/or other; priority information, for instance the transmissions with lower priority are to mute transmission on indicated resources and are to exclude those from candidates resources for selection; frequency resource location information, such as a set of frequency sub-channels, sub-bands, PRBs and/or other; a list of IDs (such as destination-layer2-ids and/or other); time resource location information, such as a set of subframes or slots periodically occurring in time; a resource reservation interval/period, such as a period of muted resource occasions; a mute/reservation interval, for instance a timer configuration to indicate for how long a command is to be valid (otherwise, the eNB 104/gNB 105 may periodically signal this command, in some embodiments); a sidelink resource pool ID, such as which sidelink pool should not be used for transmission (in some cases, this may rely on dynamic activation/deactivation of pre-configured sidelink resource pools available for transmission); location information, such as an ID of a geographical area/zone (including but not limited to a zone ID of a 3GPP standard) for which the command was issued; a resource allocation mode indication, for instance whether a mute command is applicable to Mode-3 (eNB 104/gNB 105 controlled UEs 102) or to Mode-4 (UEs 102 that use autonomous resource selection) or both modes of operation; a sidelink carrier ID, for instance an indication of sidelink carrier or carrier set where resources are to be muted; a hop counter for resource reservation/mute request; and/or other information.

In some embodiments, for mode-3 (eNB controlled) operation, a mode-3 UE 102 may request gNB 105 to indicate resource reservation/mute through Uu air-interface using the MAC CE MUTE COMMAND. In some embodiments, for mode-4 (UE autonomous) operation, a mode-4 UE 102 may signal resource reservation and mute in PSSCH using MAC CE MUTE COMMAND. The UE 102 may avoid reservation of resources that are already occupied by other UEs 102.

In some embodiments, for mode-3 (eNB controlled) operation, a mode-3 UE 102 that detects a sidelink request for mute/reservation of resource on sidelink may report information about such resources to eNB 104/gNB 105 to prevent scheduling on such resources. In some embodiments, for mode-3 (eNB controlled) operation, a mode-3 UE 102 that detects a sidelink request for mute/reservation of resource on sidelink may relay this information if predefined conditions for relaying are met.

In some embodiments, for mode-4 (UE autonomous) operation, a mode-4 UE 102 that detects a sidelink request for mute-reservation of resource on sidelink may relay this information if predefined conditions for relaying are met. In some embodiments, for mode-4 (UE autonomous) operation, a mode-4 UE 102 that detects a sidelink request for mute/reservation of resource on sidelink may exclude the resources from the set of candidate resources for selection.

In some embodiments, upon receiving a high priority emergency signal, a UE 102 may relay the signal to other UEs 102 or eNBs 104/gNBs 105. In some embodiments, the relay functionality may be handled in the physical layer. For instance, if the UE 102 decodes a DCI format or a SCI format with a specific priority and if the number of hops is less than a pre-configured threshold, the UE 102 may broadcast the transport block to other devices.

In some embodiments, the relay functionality may be handled in the MAC layer. For instance, when the MAC receives a MAC PDU with a specific priority and the number of hop is less than a threshold, the MAC may request the physical layer to broadcast this message with the same priority.

In some embodiments, a number of hops may be indicated in the emergency message. Each re-transmitting device may decrement (or increment) a hop counter. When the count reaches a threshold and/or if a latency budget is expired, devices may refrain from further retransmission of the message. In a non-limiting example, the threshold to limit the number of hops may be pre-configured in the device. In another non-limiting example, the threshold to limit the number of hops may be configured by the eNB 104/gNB 105, for instance by usage of a parameter in a message (such as an SIB. SIB 21 and/or other).

Figure 10:
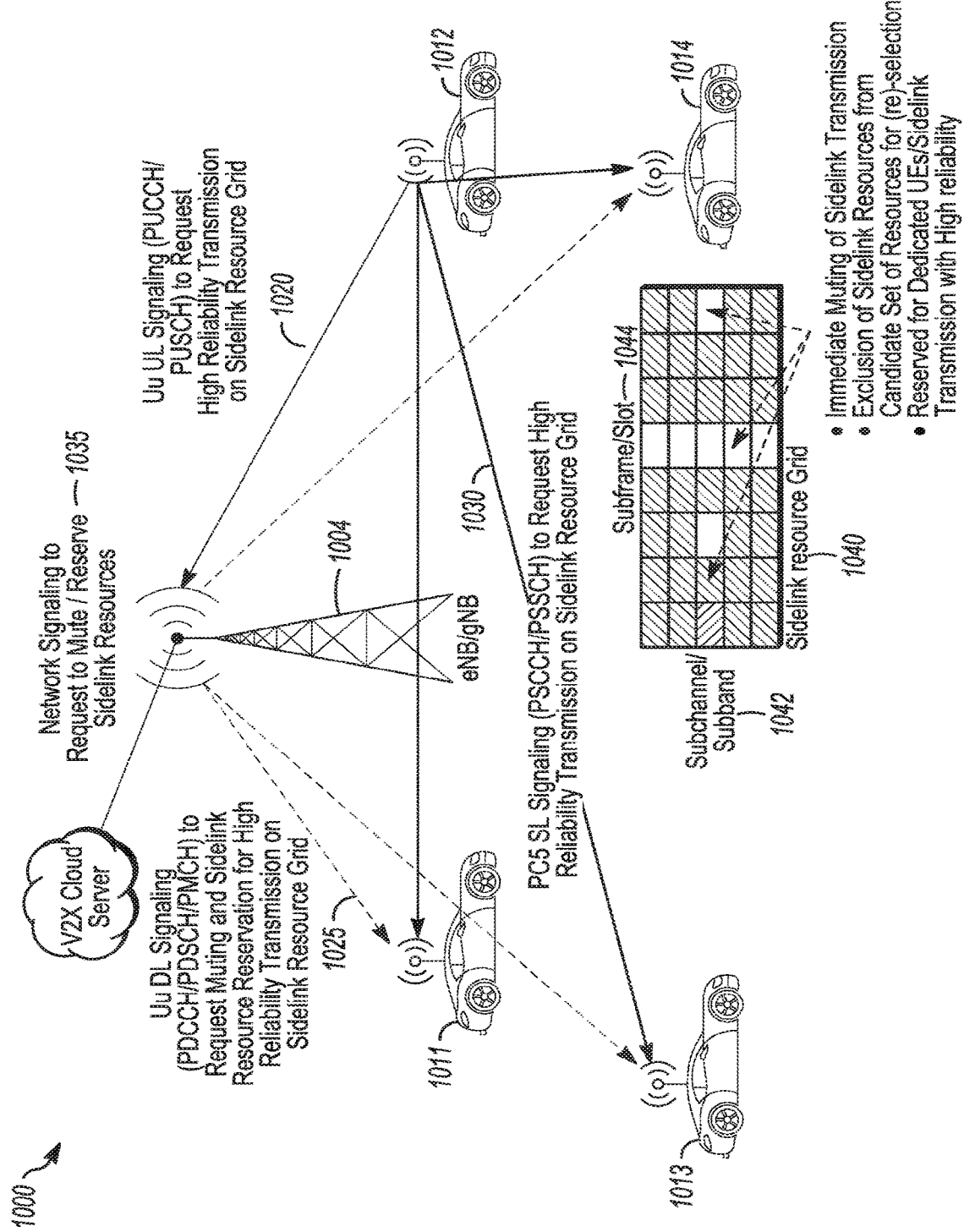
FIG. 10 illustrates example signaling that may be exchanged in accordance with some embodiments.
Figure 11A:
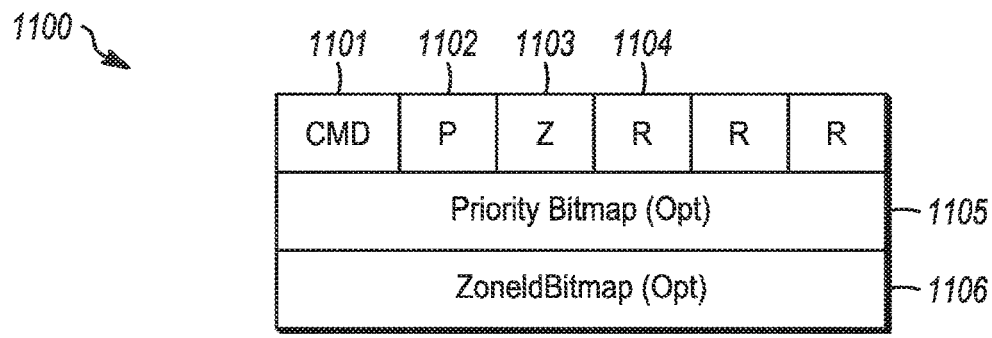
FIG. 11A, FIG. 11B, and FIG. 11C illustrate an example of a medium access control (MAC) control element (CE) that may be exchanged in accordance with some embodiments.
Figure 11B:
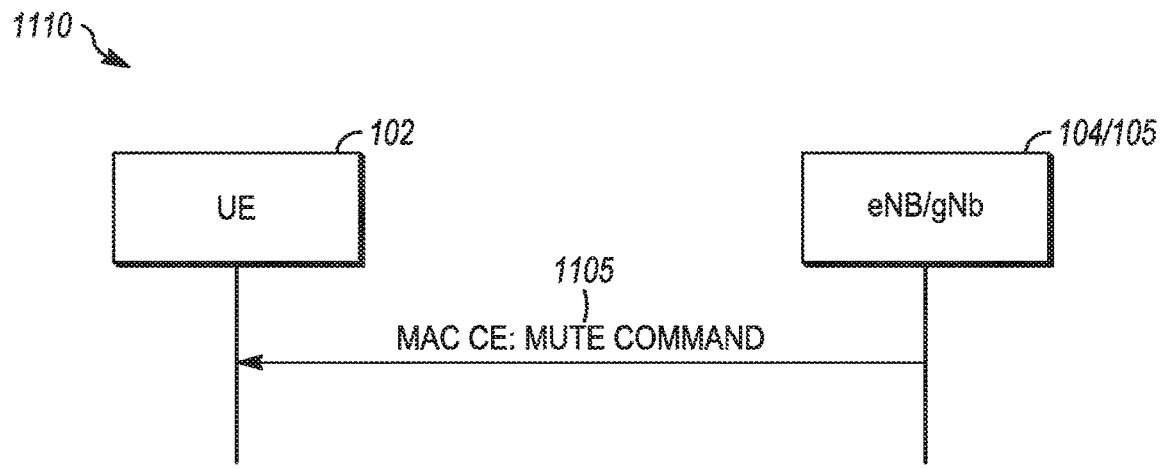
Figure 11C:
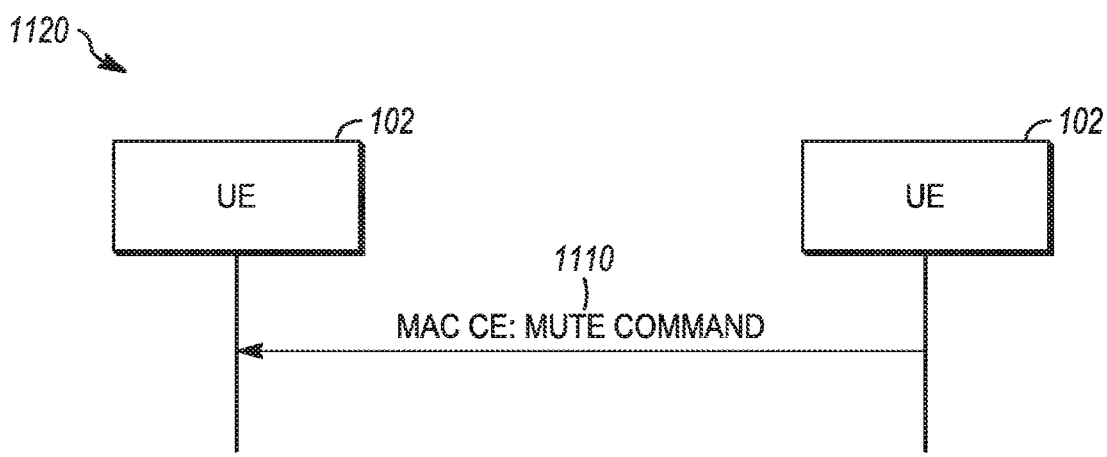
Figure 12:
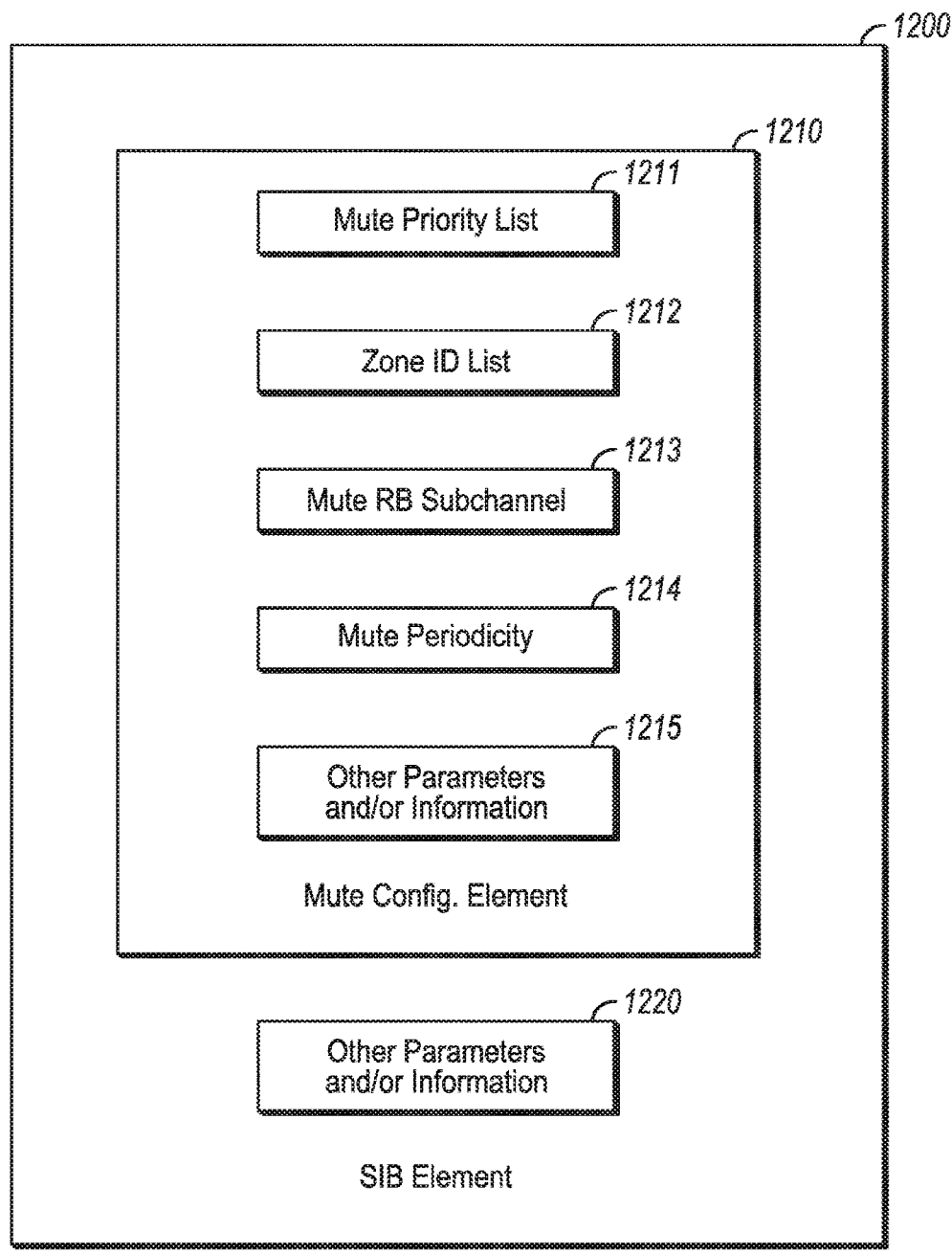
FIG. 12 illustrates an example of a system information block (SIB) element that may be exchanged in accordance with some embodiments.
Figure 13:
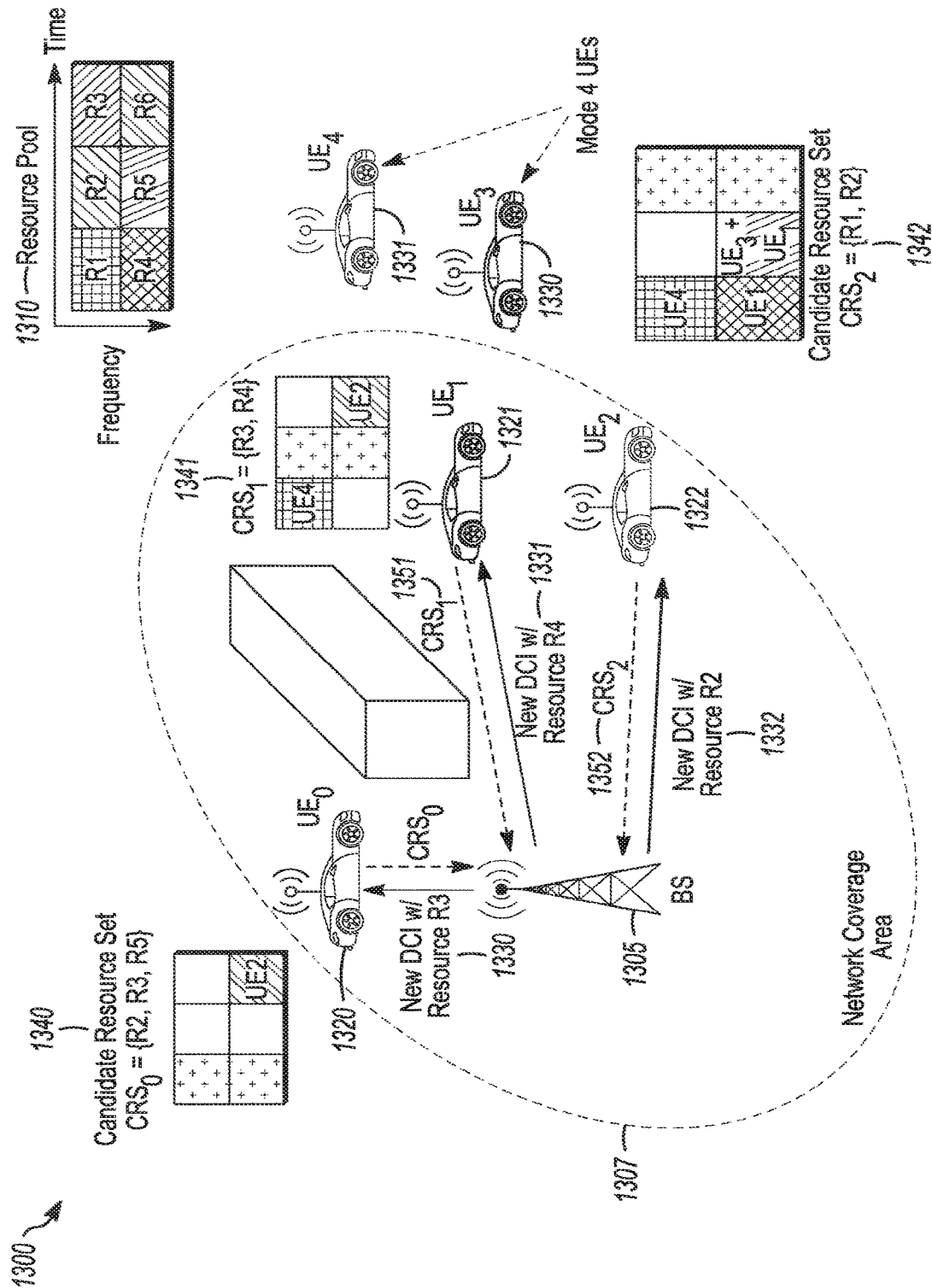
FIG. 13 illustrates example signaling that may be exchanged in accordance with some embodiments.

FIG. 10 illustrates example signaling that may be exchanged in accordance with some embodiments. FIG. 11A. FIG. 11B, and FIG. 11C illustrate an example of a medium access control (MAC) control element (CE) that may be exchanged in accordance with some embodiments. In references herein, "FIG. 11" may include FIG. 11A. FIG. 11B and FIG. 11C. FIG. 12 illustrates an example of a system information block (SIB) element that may be exchanged in accordance with some embodiments. FIG. 13 illustrates example signaling that may be exchanged in accordance with some embodiments. It should be noted that the examples shown in FIGS. 10-13 may illustrate some or all of the concepts and techniques described herein in some cases, but embodiments are not limited by the examples. For instance, embodiments are not limited by the name, number, type, size, ordering, arrangement and/or other aspects of the operations, messages, elements, signaling. eNBs 104, UEs 102, resources and other elements as shown in FIGS. 10-13. Although some of the elements shown in the examples of FIGS. 10-13 may be included in a 3GPP LTE standard, 5G standard, NR standard and/or other standard, embodiments are not limited to usage of such elements that are included in standards.

Referring to FIG. 10, examples of signaling are shown. It should be noted that vehicles 1011-1014 are shown in FIG. 10, but examples are not limited to vehicles or to devices that are associated with vehicles. In a non-limiting example, a UE 102 and/or device may be integrated with a vehicle. In another non-limiting example, a UE 102 and/or device may be physically located within the vehicle (such as carried by a person in the vehicle, sitting in the seat of a vehicle and/or other). In some embodiments, a UE 102 and/or other device (which may or may not be associated with a vehicle) may transmit and/or receive some or all of the signaling shown in FIG. 10.

As indicated by 1035, the eNB 1004 may transmit network signaling for one or more of the following: to request that one or more UEs 102 and/or devices mute transmissions; reserve sidelink resources; and/or other. As indicated by 1020, Uu uplink signaling (PUCCH. PUSCH and/or other) may be used for one or more of the following: to request high reliability transmission on a sidelink resource grid (such as 1040); and/or other. As indicated by 1025, Uu downlink signaling (PDCCH. PDSCH, PMCH and/or other) may be used for one or more of the following: to request muting, to indicate sidelink resource reservation for high reliability transmission on a sidelink resource grid (such as 1040); and/or other. As indicated by 1030. PC5 sidelink signaling (PSCCH, PSSCH and/or other) may be used for one or more of the following: to request high reliability transmission on a sidelink resource grid (such as 1040); and/or other.

The sidelink resource grid 1040 may include one or more subchannels/subbands/PRBs (1042) and one or more subframes/slots (1044). In some cases, one or more of the following may occur (which may be a result of signaling described above, although the scope of embodiments is not limited in this respect); muting of sidelink transmissions; exclusion of sidelink resources from candidate set of resources for selection/reselection; reservation of resources for dedicated UEs/sidelink transmission with high reliability; and/or other.

Referring to FIG. 11, an example MAC CE 1100 is shown. Some embodiments may not necessarily include all the parameters shown in FIG. 11. Some embodiments may include one or more additional parameters not shown in FIG. 11. Embodiments are not limited to the names, ordering and/or other aspects of the parameters shown in FIG. 11. Some or all of the parameters shown in FIG. 11 may be included in a 3GPP LTE standard, 5G standard, NR standard and/or other standard, but embodiments are not limited to usage of parameters that are included in standards. In some embodiments, one or more alternate parameters (which may or may not be included in a standard) may be used instead of one or more of the parameters shown in FIG. 11.

The MAC CE 1100 may include one or more of the following: a CMD field 1101 (such as a mute command that may take values such as "start", "stop", and/or other), the P field 1102 (which may indicate whether a priority bitmap is present), the Z field 1103 (which may indicate whether a zone bitmap is present), one or more reserved bits 1104, a priority bitmap 1105 (which may indicate one or more priorities for which the command is applicable) and a Zone ID bitmap 1106 (which may indicate one or more Zone IDs for which the command is applicable). In some embodiments, the MAC CE 1100 may include any number (including zero) of other parameters and/or information.

As indicated by 1105, the eNB 104 and/or gNB 105 may transmit a MAC CE (which may include the mute command) to the UE 102, in some embodiments. As indicated by 1110, a first UE 102 may transmit a MAC CE (which may include the mute command) to a second UE 102, in some embodiments.

Referring to FIG. 12, an example SIB element is shown. Some embodiments may not necessarily include all the parameters shown in FIG. 12. Some embodiments may include one or more additional parameters not shown in FIG. 12. Embodiments are not limited to the names, ordering and/or other aspects of the parameters shown in FIG. 12. Some or all of the parameters shown in FIG. 12 may be included in a 3GPP LTE standard, 5G standard. NR standard and/or other standard, but embodiments are not limited to usage of parameters that are included in standards. In some embodiments, one or more alternate parameters (which may or may not be included in a standard) may be used instead of one or more of the parameters shown in FIG. 12.

The SIB element 1200 may include one or more of the following: a mute priority list 1211, a zone ID list 1212, a mute RB subchannel parameter 1213, a mute periodicity parameter 1214 and any number (including zero) of other parameters and/or information 1215. In some embodiments, the SIB element 1200 may include a "Mute config element" 1210, and one or more of the parameters 1211-1215 may be included in the "Mute config element" 1210. The SIB element 1200 may also include any number (including zero) of other parameters and/or information 1220.

In some embodiments, one or more resource allocation modes for V2V communication may be used. For instance, mode-3 (eNB controlled) operation and/or mode-4 (UE autonomous) operation may be used. In eNB controlled mode (mode-3), the resource for V2V transmission may be controlled and/or assigned by the gNB 105 based on one or more factors, including but not limited to vehicle location information reported by the UE 102. In UE-autonomous mode (mode-4), the resource(s) for transmission may be selected autonomously by the UE 102 based on one or more factors, including but not limited to information determined by a sensing procedure, information determined by a resource selection procedure and/or other information. In some embodiments, resources may be shared between UEs for mode-3 and mode-4 transmissions. Accordingly, techniques to enable seamless coexistence between two V2V transmission modes (such as mode-3 and mode-4) may be used.

It should be noted that a UE 102 configured to operate in accordance with mode-3 may be referred to as a "mode-3 UE" for clarity, but such references are not limiting. For instance, an operation described herein as performed by a mode-3 UE 102 may be performed by a UE 102 and/or other device, in some embodiments. In addition, a UE 102 configured to operate in accordance with mode-4 may be referred to as a "mode-4 UE" for clarity, but such references are not limiting. For instance, an operation described herein as performed by a mode-4 UE 102 may be performed by a UE 102 and/or other device, in some embodiments.

In some embodiments, measurements and/or reporting mechanisms performed by mode-3 UEs 102 may be reported to the gNB 105 to assist in resource scheduling decisions. The measurements and/or reporting mechanisms may provide information on resource utilization, a set of candidate resource that may be used for transmission, additional complementary information (such as a priority of a transmission that occupies a given set of resources) and/or other information.

In some embodiments, triggering conditions to report additional information by mode-3 UEs 102 may be used, including periodic and event-triggered reporting modes and configuration of the report content. In some embodiments, signaling of a resource reservation period by Mode 3 UEs 102 transmitting in resources allocated in semi-persistent manner may be used. In some embodiments, a mechanism to introduce restriction on gNB 105 resource reservation duration may be used. This mechanism may be used when the UE 102 operates in a semi-persistent resource allocation mode, although the scope of embodiments is not limited in this respect.

In some embodiments, a UE-autonomous resource allocation mode may be used within and outside of network coverage scenarios. The eNB controlled mode may be used within network coverage. In some cases, the gNB 105 controlled mode may be used within network coverage and UE autonomous mode may be used for UEs 102 that are out of coverage of the gNB 105. In some cases, both modes may be supported within network coverage (that is, for UEs 102 within network coverage). In a non-limiting example, at the network edge, both modes may coexist and may share the same resource pools. In another non-limiting example, the network may want to operate certain V2X services in mode-3 and may offload other services to mode-4. In another non-limiting example, the network may provide mode-3 for services with higher priority, and may offload lower priority services to mode-4.

In some embodiments, for mode-3, the gNB 105 may utilize vehicle geo-location information to provide UE resource assignment. In some cases, including but not limited to cases in which the UEs 102 that perform V2V transmissions in the resource pool operate in mode-3, the gNB 105 may orthogonalize UE 102 transmissions based on location information and/or inter-cell coordination techniques. However, the coexistence in cases in which a mixture of mode-3 UEs 102 and mode-4 UEs 102 share the same resource pool may become problematic. For instance, the gNB 105 may not necessarily be aware about actual radio-environment and resource utilization, in some cases.

In some embodiments, mode-4 UEs 102 may perform sensing and resource selection operations in an effort to avoid collisions and/or to select less congested resources while respecting the priority information indicated by other UEs 102 in SCI Format 1. The UEs 102 that reselect resources may perform one or more of the following operations: perform receive power (radio-distance) measurements for some or all candidate resources; select a candidate set of less congested resources; randomly select resource(s) for transmission from the candidate set of resources; and/or other operation(s).

In some cases, including but not limited to mixed mode-3 and mode-4 scenarios, one or more techniques may be used in an effort to avoid scheduling of mode-3 transmissions on resources occupied by mode-4 UEs 102. In some cases, there may not necessarily be exclusive partitioning of resources among mode-3 UEs 102 and mode-4 UEs 102.

In some cases, including but not limited to shared resource pool scenarios, additional mode-3 UE 102 reporting may be used in an attempt to ensure proper operation, to respect mode-4 transmissions and/or other purpose.

In some embodiments, in order to assist the gNB 105 in scheduling of mode-3 transmissions and/or other purpose, the mode-3 UEs 102 may collect and/or report information about radio-environment and resources. For instance, a mode-3 UE 102 may report one or more measurements (such as an S-RSSI power measurement and/or other) per configured set of resources for a time interval (such as a resource selection window and/or other).

In some embodiments, the mode-3 UE 102 may report the set of candidate resources for selection (for instance, resources with received power below certain S-RSSI or PSCCH/PSSCH-RSRP threshold). In some embodiments, the mode-3 UE 102 may use one or more techniques and/or operations of a mode-4 sensing and/or resource selection procedure, although the scope of embodiments is not limited in this respect.

In some embodiments, some information may be configured by the gNB 105. Examples of such information include, but are not limited to, a size of a candidate resource set, resource configuration (such as a number of PRBs, a number of sub-bands, a size of frequency resources, a number of sub-frames, a number of TTIs, a size of time resources and/or other information that may be used for transmission, resource selection window and/or other purpose) and/or other information.

In some embodiments, the UE 102 may report information about some resources, such as resources in which the UE 102 detects a high priority transmission. In this case, the UE 102 may be configured to report resources (for instance, a set of frequency resources within a time window) to provide information about priority of transmission on allocated resources. In some embodiments, the UE 102 may be configured to monitor and report certain priority levels under predefined reporting conditions (such as a level of priority and corresponding received power contribution for a given priority level and/or other) In addition, the UE 102 may be configured to report if a resource is reserved with certain set of resource reservation periods (for instance, 100 msec, 200 msec and/or other) and to refrain from reporting for transmissions with higher resource reservation periods.

In some embodiments, the UE 102 may report a resource selection mode (such as mode-3 or mode-4) of a transmission detected by the UE 102. In some cases, signaling of the resource selection mode (mode-3 or mode-4) may be used by the gNB 105 for resource selection. In some embodiments, the UE 102 may report a V2X service type indicated by other UEs 102 occupying certain resources. If the UE 102 detects that a significant portion of received power is transmitted by a UE 102 not controlled by the network, the network (gNB 105 or other component) may refrain from usage and/or assignment of this resource. In some embodiments, the gNB 105 may optimize resource allocation and reuse resources which are signaled as occupied resources. To enable this operation, an additional field (mode-3/mode-4 indicator) may be included in an element (such as an SCI, MAC CE, information element, RRC signaling and/or other) to signal whether the occupied resource were selected with gNB 105 assistance.

In some embodiments, UE 102 reporting may be UE specifically configured as periodic (for instance, sent to the gNB 105 every "Treport" msec, such as Treport=1000 msec and/or other value). Embodiments are not limited to the "Treport" parameter, as any parameter related to periodicity may be used. In some embodiments, the UE 102 reporting may be event-triggered based on one or more of the following events: resource reselection was triggered by eNB; a time from a previous report has expired; a time for a new resource (re)-selection has come; a measured CBR level is below or above a threshold; a transmission priority above a preconfigured set of values is detected; one or more transmission parameters have been changed (such as a required resource reservation interval, an amount of required resources and/or other parameter); and/or other event.

In some embodiments, in mode-3, sidelink transmissions may be dynamically or semi-statically scheduled by the gNB 105. In a non-limiting example, SPS activation/deactivation commands in DCI Format 5A may be used. In case of dynamic scheduling, the coexistence between mode-3 and mode-4 transmissions may be more problematic since mode-3 transmission assignments may look like random resource selections from the perspective of the UE 102 that performs sensing and resource selection. Therefore, a mode-4 UE 102 may not necessarily take into account mode-3 transmissions scheduled dynamically in its own resource selection. On the other hand, when mode-3 utilizes SPS scheduling mechanism, the information about transmission period may be signaled by mode-3 UE 102 in SCI format 1, according to configured value of SPS transmission period. If the transmission period is indicated as a resource reservation interval in SCI-Format 1, the mode-4 UEs 102 may take it into account in sensing and resource selection procedures (including but not limited to procedures of a 3GPP standard and/or other standard). However, this impact on mode-4 UEs 102 may be significant, for instance if scheduling decisions by the gNB 105 do not respect mode-4 UE 102 resource selection decisions.

In some embodiments, a mode-4 UE 102 may reselect resources after transmission of a certain number of transport blocks (TBs). In some embodiments, the mode-4 UE 102 may then reselect resource upon a TB counter expiration condition. In case of a gNB 105 scheduled mode, a mode-3 UE 102 may keep resources for a relatively long time. In some cases, this may lead to certain performance loss as the mode-4 UEs 102 may be limited in terms of resource selection.

In some embodiments, mode-3 UEs 102 may reselect resources after certain amount of time (for instance, the gNB 105 may periodically re-assign resources for V2V communication). The corresponding triggers to reassign resources for mode-3 transmissions may be defined in case of gNB 105 controlled operation. In some embodiments, a counter based trigger may be applicable for mode-3 operation in resource pool shared with mode-4 UEs 102. Alternatively, this mechanism may be used to provide preferential access to resources and radio-propagation conditions for mode-3 UEs 102.

In some embodiments, the gNB 105 may configure UE 102 mode-3/mode-4 switching conditions, so that the UE 102 may switch from mode-4 to mode-3 and vice versa. In a non-limiting example, UE specific or cell specific RRC or SIB signaling may be used to provide this information to UEs 102. The potential conditions may include, but are not limited to: a V2X service type or QoS requirement, a V2X service/transmission priority (such as PPPP); Uu link RSRP conditions (such as an RSRP value); required resource reservation period below or above a predefined value; a measured CBR value above or below a threshold; the UE 102 is within certain geo-graphical area; a trigger of cell reselection; a handover procedure; and/or other.

In some embodiments, a method of sharing resources by mode-3 and mode-4 sidelink V2V communication may comprise or may be based on one or more of: sidelink measurement performed by mode-3 or mode-4 UEs 102 to assist gNB 105 scheduling decisions; signaling of V2X service type and mode-3/mode-4 indicator; reporting mechanism to signal UE 102 sidelink measurements to gNB 105; signaling to configure conditions to perform measurement or reporting by UEs 102; conditions for UE mode-3/mode-4 switching and corresponding signaling; conditions for UE 102 mode-3 resource reselection.

In some embodiments, measurements performed by UEs 102 to assist gNB 105 scheduling decisions may comprise one or more of: sensing measurements, such as S-RSSI and PSCCH/PSSCH-RSRP measurements to characterize quality of sidelink V2V resources over certain time interval (such as a sensing window or resource selection window); resource selection measurements, such as estimation of candidate subset of resources for selection, based on configured resource definition (for instance, a number of PRBs) and determined according to sensing and resource selection procedure (for instance, based on minimum average received power criteria); occupied resource measurements, such as estimation of a set of resources occupied by transmissions with indicated priority level from the preconfigured set of priorities (or resources with received power above a certain threshold, for instance congested resources); resources occupied by mode-3 or mode-4 transmissions or by given V2X service, for instance utilizing resource reservation period from the predefined set of values; and/or other.

In some embodiments, signaling of V2X service type and mode-3/mode-4 indicator may be included into the SCI format signaling (L1 signaling), MAC or RRC signaling to indicate which V2X service is delivered or whether transmission is controlled by gNB 105 or UE-autonomous. In some embodiments, a reporting mechanism to signal UE measurements to eNB may comprise one or more of: RRC or MAC signaling to provide UE sidelink measurement report (sensing and resource selection report) to gNB 105, gNB 105 configuration signaling to configure measurements requested by gNB 105 or sidelink measurement report triggering conditions, periodic or event-triggered reporting, in which the UE reporting may be UE specifically configured as periodic or event-triggered based on certain set of conditions. In some embodiments, signaling to configure conditions to perform measurement or reporting by UEs 102 may comprise RRC or SIB21 signaling to configure measurements reports or conditions to perform measurements.

In some embodiments, conditions for UE mode-3/mode-4 switching and corresponding signaling may include one or more of condition on V2X service type or QoS requirement to be served by mode-3/4; condition on V2X service/transmission priority (e.g. PPPP) to be served by mode-3/4; Uu link RSRP conditions (for instance, an RSRP value); required resource reservation period below or above predefined value to be served by mode-3/4; measured CBR value above or below certain threshold to be served by mode-3/4; UE 102 is within certain geo-graphical area to be served by mode-3/4; trigger of cell reselection, handover procedure; and/or other. In some embodiments, conditions for UE mode-3 resource reselection may comprise a counter based trigger for mode-3 operation in resource pool shared with mode-4 UEs 102, restriction on amount of TBs transmitted under selected resource; and/or other.

Referring to FIG. 13, examples of signaling are shown. It should be noted that vehicles are shown for UEs 1320, 1321, 1322, 1330, and 1331 are shown in FIG. 13, but examples are not limited to vehicles or to devices that are associated with vehicles. In a non-limiting example, a UE 102 and/or device may be integrated with a vehicle. In another non-limiting example, a UE 102 and/or device may be physically located within the vehicle (such as carried by a person in the vehicle, sitting in the seat of a vehicle and/or other). In some embodiments, a UE 102 and/or other device (which may or may not be associated with a vehicle) may transmit and/or receive some or all of the signaling shown in FIG. 13.

As shown in FIG. 13, the network coverage area 1307 for eNB 1305 may support communication with UEs 1320-1322. Accordingly, the UEs 1320-1322 may perform sidelink communication in accordance with mode-3 operation, in some embodiments. The UEs 1330, 1331 may operate outside of the network coverage area 1307. Accordingly, the UEs 1330, 1331 may perform sidelink communication in accordance with mode-4 operation, in some embodiments.

The resource grid 1310 includes resources R1-R6, but embodiments are not limited to this number of resources, to the number of resources in the time dimension of grid 1310 or to the number of resources in the frequency dimension of grid 1310. The eNB 1305 may transmit DCI 1330 to the UE 1320 (UE0) that indicates that the UE 1320 (UE0) is to use R3. The eNB 1305 may transmit additional DCIs (such as DCI 1331 to UE 1321 (UE1), DCI 1332 to the UE 1322 (UE2) and/or other DCI(s)) that may indicate resources to be used by those UEs.

In the example shown in FIG. 13, the UE 1331 (UE4) may transmit on R1, and this may be detected by the UE 1321 (UE1) and by the UE 1322 (UE2). In addition, the UE 1330 (UE3) may transmit on R5, and this may be detected by the UE 1322 (UE2). The UE 1321 (UE1) may transmit information (such as 1351) to the eNB 1305. Such information may include an indication that the UE 1321 (UE1) has detected transmission in R1 and/or other information. The UE 1322 (UE2) may transmit information (such as 1352) to the eNB 1305. Such information may include an indication that the UE 1322 (UE2) has detected transmission in R1 and R5 and/or other information.

Candidate resource sets (such as CRS 1341 for UE 1321 and CRS 1342 for UE 1322) may be modified based at least partly on detected transmissions and/or messages from the eNB 1305.

In Example 1, an apparatus of a Generation Node-B (gNB) may comprise memory. The apparatus may further comprise processing circuitry. The processing circuitry may be configured to allocate a resource pool of physical resource blocks (PRBs) and sub-frames for vehicle-to-vehicle (V2V) sidelink transmissions. The processing circuitry may be further configured to decode, from a User Equipment (UE), an uplink control message that indicates that the UE requests a V2V sidelink transmission of a prioritized message. The processing circuitry may be further configured to select, for the V2V sidelink transmission of the prioritized message, one or more PRBs of the resource pool and one or more sub-frames of the resource pool. The processing circuitry may be further configured to encode, for transmission to the UE and to other UEs, a downlink control message that indicates: the selected PRBs, the selected sub-frames, and that the other UEs are to mule sidelink transmissions in the selected PRBs in the selected sub-frames to enable the V2V sidelink transmission of the prioritized message. The memory may be configured to store information identifying the selected PRBs and the selected sub-frames.

In Example 2, the subject matter of Example 1, wherein the downlink control message is a first downlink control message. The processing circuitry may be further configured to encode, for transmission, a first downlink control message that indicates the PRBs of the resource pool and the sub-frames of the resource pool.

In Example 3, the subject matter of one or any combination of Examples 1-2, wherein the downlink control message may further indicate a time duration for which the other UEs are to mute the sidelink transmissions in the selected PRBs in the selected sub-frames.

In Example 4, the subject matter of one or any combination of Examples 1-3, wherein the downlink control message may be a medium access control (MAC) control element (CE) included in a physical downlink shared channel (PDSCH).

In Example 5, the subject matter of one or any combination of Examples 1-4, wherein the downlink control message may be a physical downlink control channel (PDCCH). The PDCCH may include a downlink control information (DCI) that includes the selected PRBs and the selected sub-frames.

In Example 6, the subject matter of one or any combination of Examples 1-5, wherein the downlink control message may be a broadcast system information block (SIB).

In Example 7, the subject matter of one or any combination of Examples 1-6, wherein: the uplink control message may be included in a physical uplink shared channel (PUSCH), or the uplink control message may be a physical uplink control channel (PUCCH).

In Example 8, the subject matter of one or any combination of Examples 1-7, wherein the uplink control message may indicate one or more of: a transmission period for the V2V sidelink transmission of the prioritized message, a number of PRBs for the V2V sidelink transmission of the prioritized message, and a buffer status report. The processing circuitry may be further configured to select the PRBs and the sub-frames for the V2V sidelink transmission of the prioritized message based at least partly on the uplink control message.

In Example 9, the subject matter of one or any combination of Examples 1-8, wherein the gNB may be arranged to operate in accordance with a Third Generation Partnership Project (3GPP) protocol. The gNB may be configured for mode-3 operation, wherein the gNB is to select the PRBs and the sub-frames of the resource pool for the V2V sidelink transmissions.

In Example 10, the subject matter of one or any combination of Examples 1-9, wherein the gNB may be arranged to operate in accordance with a Third Generation Partnership Project (3GPP) protocol. The uplink control message may be received over an uplink Uu interface. The downlink control message may be transmitted over a downlink Uu interface.

In Example 11, the subject matter of one or any combination of Examples 1-10, wherein the downlink control message is a first downlink control message, and the uplink control message is a first uplink control message. The processing circuitry may be further configured to encode, for transmission, a second downlink control message that instructs the UE to sense a sidelink channel in accordance with one or more channel sense parameters. The processing circuitry may be further configured to decode, from the UE, a second uplink control message that indicates one or more results of the sense operation in accordance with the channel sense parameters.

In Example 12, the subject matter of one or any combination of Examples 1-11, wherein the downlink control message is a first downlink control message. The processing circuitry may be further configured to encode, for transmission, a second downlink control message that instructs the UE to perform radio-layer measurements within sidelink resource pools to determine candidate resources available for sidelink transmission.

In Example 13, the subject matter of one or any combination of Examples 1-12, wherein the second downlink control message is a radio resource control (RRC) message. The RRC message may include one or more triggering conditions for measurement and reporting of results by the UE.

In Example 14, the subject matter of one or any combination of Examples 1-13, wherein the triggering conditions are based on one or more of: a received power threshold or a reference signal received power (RSRP) threshold for detected sidelink transmissions, and a priority threshold for detected sidelink transmissions.

In Example 15, the subject matter of one or any combination of Examples 1-14, wherein the RRC message may indicate that the UE is to use a reporting format that indicates, from the sidelink resource pools; recommended resources for allocation for sidelink transmissions, or resources to refrain from allocation for the sidelink transmissions.

In Example 16, the subject matter of one or any combination of Examples 1-15, wherein the apparatus may further include a transceiver to receive the uplink control message and to transmit the downlink control message.

In Example 17, the subject matter of one or any combination of Examples 1-16, wherein the processing circuitry may include a baseband processor to select the PRBs and the sub-frames for the V2V sidelink transmission of the prioritized message.

In Example 18, a computer-readable storage medium may store instructions for execution by one or more processors to perform operations for communication by a Generation Node-B (gNB). The operations may configure the one or more processors to allocate a resource pool of physical resource blocks (PRBs) and sub-frames for; mode-3 vehicle-to-vehicle (V2V) sidelink transmissions in accordance with resource selection by the gNB, and mode-4 V2V sidelink transmissions in accordance with autonomous resource selection by User Equipments (UEs). The operations may further configure the one or more processors to encode, for transmission to a first UE, a downlink control message that indicates one or more parameters for a channel sense measurement for the resource pool. The operations may further configure the one or more processors to decode, from the first UE, an uplink control message that indicates the channel sense measurement. The operations may further configure the one or more processors to select, based at least partly on the channel sense measurement, one or more resources of the resource pool for a mode-3 V2V sidelink transmission by a second UE.

In Example 19, the subject matter of Example 18, wherein the channel sense measurement may be a sidelink received signal strength indicator (S-RSSI).

In Example 20, the subject matter of one or any combination of Examples 18-19, wherein the parameters for the channel sense measurement may include a number of PRBs a number of sub-frames.

In Example 21, the subject matter of one or any combination of Examples 18-20, wherein the downlink control message is a first downlink control message. The operations may further configure the one or more processors to encode, for transmission to the second UE, a second downlink control message that indicates the selected resources for the mode-3 V2V sidelink transmission by a second UE.

In Example 22, the subject matter of one or any combination of Examples 18-21, wherein the resources selected for the mode-3 V2V sidelink transmission by the second UE are second resources. The channel sense measurement may be related to first resources of the resource pool. The operations may further configure the one or more processors to determine, based at least partly on the channel sense measurement, whether the first resources are unavailable for mode-3 V2V sidelink transmissions. The operations may further configure the one or more processors to, if it is determined that the first resources are unavailable for mode-3 V2V sidelink transmissions, select the second resources from candidate resources that exclude the first resources.

In Example 23, an apparatus of a User Equipment (UE) may comprise memory. The apparatus may further comprise processing circuitry. The processing circuitry may be configured to determine that a prioritized message is to be transmitted to another UE over a vehicle-to-vehicle (V2V) sidelink. The processing circuitry may be further configured to select one or more physical resource blocks (PRBs) and one or more sub-frames to be used for transmission of the prioritized message over the V2V sidelink. The PRBs and sub-frames may be included in a resource pool of candidate PRBs and candidate sub-frames. The processing circuitry may be further configured to encode, for transmission to other UEs, a sidelink control message that indicates: the selected PRBs, the selected sub-frames, and a mute command that indicates that the other UEs are to mute sidelink transmissions in the selected PRBs in the selected sub-frames. The processing circuitry may be further configured to encode the prioritized message for transmission in the selected PRBs in the selected sub-frames. The memory may be configured to store at least a portion of the prioritized message.

In Example 24, the subject matter of Example 23, wherein the processing circuitry may be further configured to determine that the prioritized message is to be transmitted over the V2V sidelink based at least partly on an indicator generated by an application layer of the UE.

In Example 25, the subject matter of one or any combination of Examples 23-24, wherein the sidelink control message may be included in a physical sidelink shared channel (PSSCH), or the sidelink control message may be a physical sidelink control channel (PSCCH) that includes a sidelink control information (SCI) that includes the selected PRBs and the selected sub-frames.

In Example 26, the subject matter of one or any combination of Examples 23-25, wherein the UE may be arranged to operate in accordance with a Third Generation Partnership Project (3GPP) protocol. The UE may be configured for mode-4 operation, wherein the UE is to select the PRBs and the sub-frames for V2V sidelink transmissions.

In Example 27, the subject matter of one or any combination of Examples 23-26, wherein the other UE is a first UE, and the prioritized message is received from a second UE. The processing circuitry may be further configured to encode the prioritized message for relay to the first UE in the selected PRBs in the selected sub-frames.

In Example 28, an apparatus of a Generation Node-B (gNB) may comprise means for allocating a resource pool of physical resource blocks (PRBs) and sub-frames for: mode-3 vehicle-to-vehicle (V2V) sidelink transmissions in accordance with resource selection by the gNB, and mode-4 V2V sidelink transmissions in accordance with autonomous resource selection by User Equipments (UEs). The apparatus may further comprise means for encoding, for transmission to a first UE, a downlink control message that indicates one or more parameters for a channel sense measurement for the resource pool. The apparatus may further comprise means for decoding, from the first UE, an uplink control message that indicates the channel sense measurement. The apparatus may further comprise means for selecting, based at least partly on the channel sense measurement, one or more resources of the resource pool for a mode-3 V2V sidelink transmission by a second UE.

In Example 29, the subject matter of Example 28, wherein the channel sense measurement may be a sidelink received signal strength indicator (S-RSSI).

In Example 30, the subject matter of one or any combination of Examples 28-29, wherein the parameters for the channel sense measurement may include a number of PRBs a number of sub-frames.

In Example 31, the subject matter of one or any combination of Examples 28-30, wherein the downlink control message is a first downlink control message. The apparatus may further comprise means for encoding, for transmission to the second UE, a second downlink control message that indicates the selected resources for the mode-3 V2V sidelink transmission by a second UE.

In Example 32, the subject matter of one or any combination of Examples 28-31, wherein the resources selected for the mode-3 V2V sidelink transmission by the second UE are second resources. The channel sense measurement may be related to first resources of the resource pool. The apparatus may further comprise means for determining, based at least partly on the channel sense measurement, whether the first resources are unavailable for mode-3 V2V sidelink transmissions. The apparatus may further comprise means for, if it is determined that the first resources are unavailable for mode-3 V2V sidelink transmissions, selecting the second resources from candidate resources that exclude the first resources.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. A method, comprising:
   a base station,
      allocating a resource pool of physical resource blocks (PRBs) and sub-frames for sidelink transmissions;
      decoding, from a user equipment (UE), an uplink control message that indicates that the UE requests a sidelink transmission of a prioritized message in a transmission period;

selecting, for the sidelink transmission of the prioritized message, one or more PRBs of the resource pool and one or more sub-frames of the resource pool; and encoding, for transmission to the UE and to at least one other target UE in a cell area, a downlink control message that indicates selected PRBs, selected sub-frames, and a mute operation for the transmission period for the at least one other target UE to enable the sidelink transmission of the prioritized message.

2. The method of claim 1,
wherein the mute operation is for a finite duration.

3. The method of claim 1,
wherein the mute operation indicates that the at least one other target UE is to mute sidelink transmissions in the selected PRBs in the selected sub-frames.

4. The method of claim 1,
wherein the downlink control message is a first downlink control message, and wherein the method further comprises the base station:
encoding, for transmission, a second downlink control message that indicates the PRBs of the resource pool and the sub-frames of the resource pool.

5. The method of claim 1,
wherein the downlink control message is a medium access control (MAC) control element (CE) included in a physical downlink shared channel (PDSCH).

6. The method of claim 1,
wherein the downlink control message is a physical downlink control channel (PDCCH), and
wherein the PDCCH includes a downlink control information (DCI) that includes the selected PRBs and the selected sub-frames.

7. The method of claim 1,
wherein the downlink control message is a broadcast system information block (SIB).

8. The method of claim 1,
wherein the uplink control message is included in a physical uplink shared channel (PUSCH), or
wherein the uplink control message is a physical uplink control channel (PUCCH).

9. The method of claim 1,
wherein the uplink control message indicates one or more of: a transmission period for the sidelink transmission of the prioritized message, a number of PRBs for the sidelink transmission of the prioritized message, and a buffer status report, and
wherein the method further comprises the base station selecting the PRBs and the sub-frames for the sidelink transmission of the prioritized message based at least partly on the uplink control message.

10. The method of claim 1,
wherein the base station is arranged to operate in accordance with a Third Generation Partnership Project (3GPP) protocol, and
wherein the base station is configured for mode-3 operation, wherein the base station is to select the PRBs and the sub-frames of the resource pool for the sidelink transmissions.

11. The method of claim 1,
wherein the base station is arranged to operate in accordance with a Third Generation Partnership Project (3GPP) protocol,
wherein the uplink control message is received over an uplink Uu interface, and
wherein the downlink control message is transmitted over a downlink Uu interface.

12. A base station, comprising:
a memory; and
at least one processor in communication with the memory and configured to cause the base station to:
allocate a resource pool of physical resource blocks (PRBs) and sub-frames for sidelink transmissions;
decode, from a user equipment (UE), an uplink control message that indicates that the UE requests a sidelink transmission of a prioritized message in a transmission period;
select, for the sidelink transmission of the prioritized message, one or more PRBs of the resource pool and one or more sub-frames of the resource pool; and
encode, for transmission to the UE and to at least one other target UE in a cell area, a downlink control message that indicates selected PRBs, selected sub-frames, and a mute operation for the transmission period indicating that the at least one other target UE is to mute sidelink transmissions in the selected PRBs in the selected sub-frames to enable the sidelink transmission of the prioritized message.

13. The base station of claim 12,
wherein the mute operation is for a finite duration.

14. The base station of claim 12,
wherein the downlink control message is a first downlink control message,
wherein the uplink control message is a first uplink control message, and
wherein the at least one processor is further configured to cause the base station to:
encode, for transmission, a second downlink control message that instructs the UE to sense a sidelink channel in accordance with one or more channel sense parameters; and
decode, from the UE, a second uplink control message that indicates one or more results of a sense operation in accordance with the channel sense parameters.

15. The base station of claim 12,
wherein the downlink control message is a first downlink control message, and
wherein the at least one processor is further configured to cause the base station to:
encode, for transmission, a second downlink control message that instructs the UE to perform radio-layer measurements within sidelink resource pools to determine candidate resources available for sidelink transmission.

16. The base station of claim 15,
wherein the second downlink control message is a radio resource control (RRC) message, and
wherein the RRC message includes one or more triggering conditions for measurement and reporting of results by the UE.

17. The base station of claim 16,
wherein the triggering conditions are based on one or more of:
a received power threshold or a reference signal received power (RSRP) threshold for detected sidelink transmissions, or
a priority threshold for detected sidelink transmissions.

18. The base station of claim 16,
wherein the RRC message indicates that the UE is to use a reporting format that indicates, from the sidelink resource pools:
recommended resources for allocation for sidelink transmissions, or resources to refrain from allocation for the sidelink transmissions.

19. An apparatus comprising:
a memory; and
at least one processor in communication with the memory and configured to cause a user equipment (UE) to:
  determine that a prioritized message is to be transmitted to another UE over sidelink in a transmission period;
  select one or more physical resource blocks (PRBs) and one or more sub-frames to be used for transmission of the prioritized message over the sidelink, wherein the PRBs and sub-frames are included in a resource pool of candidate PRBs and candidate sub-frames;
  encode, for transmission to at least one other target UE in a cell area, a sidelink control message that indicates selected PRBs, selected sub-frames, and a mute operation for the transmission period for the at least one other target UE to enable sidelink transmission of the prioritized message; and
  encode the prioritized message for transmission in the selected PRBs in the selected sub-frames.

20. The apparatus of claim 19,
wherein the at least one processor is further configured to:
  determine that the prioritized message is to be transmitted over the sidelink based at least partly on an indicator generated by an application layer of the UE.

\* \* \* \* \*